US012696003B2

(12) United States Patent  (10) Patent No.: US 12,696,003 B2
Im et al.  (45) Date of Patent: Jul. 28, 2026

(54) IMAGE PROCESSING DEVICE OF VISION SENSOR

(71) Applicant: SAMSUNG ELECTRONICS CO., LTD., Suwon-si (KR)

(72) Inventors: Gyu Beom Im, Suwon-si (KR); Keun Joo Park, Suwon-si (KR); Jun Seok Kim, Suwon-si (KR); Jun Hyuk Park, Suwon-si (KR); Bong Ki Son, Suwon-si (KR); Ji Won Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 18/744,213

(22) Filed: Jun. 14, 2024

(65) Prior Publication Data

US 2024/0422447 A1  Dec. 19, 2024

(30) Foreign Application Priority Data

Jun. 16, 2023 (KR) ........................ 10-2023-0077554

(51) Int. Cl.
　　*H04N 25/47* (2023.01)
　　*H04N 23/745* (2023.01)
　　*H04N 25/60* (2023.01)
(52) U.S. Cl.
　　CPC .......... *H04N 25/47* (2023.01); *H04N 23/745* (2023.01); *H04N 25/60* (2023.01)
(58) Field of Classification Search
　　None
　　See application file for complete search history.

(56) References Cited

U.S. PATENT DOCUMENTS

| | | | |
|---|---|---|---|
| 7,454,078 B2 | 11/2008 | Ramamurthy | |
| 11,303,804 B2 | 4/2022 | Sironi et al. | |
| 11,416,759 B2 | 8/2022 | Lang et al. | |
| 2017/0169550 A1* | 6/2017 | Dewhurst | .............. G06V 20/40 |
| 2018/0032150 A1* | 2/2018 | Lee | ........................ G06F 1/3262 |
| 2021/0067679 A1 | 3/2021 | Tornes | |
| 2022/0191382 A1 | 6/2022 | Chen et al. | |
| 2023/0007156 A1 | 1/2023 | Bowers | |
| 2023/0217117 A1* | 7/2023 | Kaizu | .................. H04N 23/745 |
| | | | 348/226.1 |

FOREIGN PATENT DOCUMENTS

| | | | | |
|---|---|---|---|---|
| CN | 114500860 A | 5/2022 | | |
| CN | 115412688 A | 11/2022 | | |
| EP | 3 162 067 B1 | 3/2021 | | |
| KR | 102707749 B1 * | 9/2024 | ............. | H04N 25/78 |
| WO | 2021/111873 A1 | 6/2021 | | |
| WO | 2021/190745 A1 | 9/2021 | | |
| WO | 2021/200523 A1 | 10/2021 | | |

* cited by examiner

*Primary Examiner* — Quan Pham
(74) *Attorney, Agent, or Firm* — Sughrue Mion, PLLC

(57) ABSTRACT

An image processing device is provided. The image processing device includes: a memory; a vision sensor; and at least one processor operatively connected to the memory and the vision sensor, wherein the at least one processor is configured to: receive an event signal from a pixel array of the vision sensor, accumulate the event signal during a preset time and store, in the memory, the event signal as accumulated event data; perform a pixel correction on the stored accumulated event data; and compare the corrected accumulated event data with the event signal to extract valid event data.

13 Claims, 18 Drawing Sheets

ON Timestamp Map

OFF Timestamp Map

NON Timestamp Map

Raw

Non-Flicker (Temporal Filter)

Smooting + Edge Filter

Non-Flicker(Spatio-Temporal Filter)

IMAGE PROCESSING DEVICE OF VISION SENSOR

CROSS-REFERENCE TO RELATED APPLICATION

This application is based on and claims priority under 35 U.S.C. § 119 to Korean Patent Application No. 10-2023-0077554, filed on Jun. 16, 2023, in the Korean Intellectual Property Office, the disclosure of which is incorporated by reference herein in its entirety.

BACKGROUND

1. Field

The disclosure relates to an image processing device, particularly to, a vision sensor and an image processing device thereof.

2. Description of the Related Art

A human-computer interaction (HCl) manifests and operates in a user interface. Various user interfaces that recognize a user input may provide natural interaction between humans and computers. Various sensors may be used to recognize the user input.

In general, an image sensor may be broadly divided into an image sensor that operates synchronously and an image sensor that operates asynchronously. A representative example of the image sensor that operates synchronously is a complementary metal-oxide semiconductor (CMOS) image sensor. A typical example of an image sensor that operates asynchronously is a dynamic vision sensor (DVS).

The dynamic vision sensor detects changes in intensity of incident light to generate an event signal (e.g., an On-event signal or an Off-event signal) and transmits the event signal to a processor.

A flicker phenomenon means a phenomenon (e.g., a flickering phenomenon) in which the intensity of light emitted from a peripheral lighting device of an image processing system or an electronic apparatus including a display periodically changes. Although an ideal dynamic vision sensor is designed not to detect the flicker phenomenon as an event, since a real dynamic vision sensor detects the aforementioned flicker phenomenon as an event, there is a risk of degradation of the performance of the entire image processing system due to the flicker noise.

SUMMARY

Provided are an image processing device which has improved performance by removing a flicker noise and effectively extracting an edge signal.

According to an aspect of the disclosure, an image processing device includes: a memory; a vision sensor; and at least one processor operatively connected to the memory and the vision sensor, wherein the at least one processor is configured to: receive an event signal from a pixel array of the vision sensor; accumulate the event signal during a preset time and store, in the memory, the event signal as accumulated event data; perform a pixel correction on the stored accumulated event data; and compare the corrected accumulated event data with the event signal to extract valid event data.

According to an aspect of the disclosure, an image processing device includes: a pixel array including a plurality of pixels in a vision sensor, each pixel generating an event signal from light reflected from an object; a memory operatively connected to the pixel array, the memory being configured to accumulate the event signal during a preset time and to store accumulated event signals as accumulated event data; and a filter configured to perform a pixel correction on the accumulated event data, wherein the image processing device is configured to extracts, as valid event data, a signal which is non-overlapped with the corrected accumulated event data, the signal being among the event signals generated from the pixel array.

According to an aspect of the disclosure, an image processing device includes: a plurality of pixels, each pixel generating an event signal from light reflected from an object; and at least one processor configured to: accumulate the event signal to generate an accumulated image, perform a Gaussian filtering on the accumulated image, perform a polarity filtering by subtracting a Gaussian-filtered accumulated image from the accumulated image and generate a plurality of polarity-filtered images, and sum the plurality of polarity-filtered images and output valid event data.

According to an aspect of the disclosure, an image processing device includes: a pixel array including a plurality of pixels, each pixel generating an event signal based on light reflected from an object; a memory configured to accumulate the event signal received from the pixel array during a preset unit time and to store the accumulated even signals as an accumulated image; a first filter configured to filter pixels having overlapping On-Off events in the accumulated image; and a second filter configured to subtract an image, which is output from the first filter, from the accumulated image of the memory to perform a polarity filtering and configure to generate a plurality of polarity-filtered images, wherein a plurality of polarity-filtered images are summed and output as valid event data.

However, aspects of the disclosure are not restricted to the one set forth herein. The above and other aspects of the disclosure will become more apparent to one of ordinary skill in the art to which the disclosure pertains by referencing the detailed description of the disclosure given below.

BRIEF DESCRIPTION OF DRAWINGS

The above and other aspects, features, and advantages of certain embodiments of the disclosure will be more apparent from the following description taken in conjunction with the accompanying drawings, in which:

FIG. 18 is a block diagram showing an electronic device to which the vision sensor of FIG. 1 is applied.

DETAILED DESCRIPTION

Figure 1:
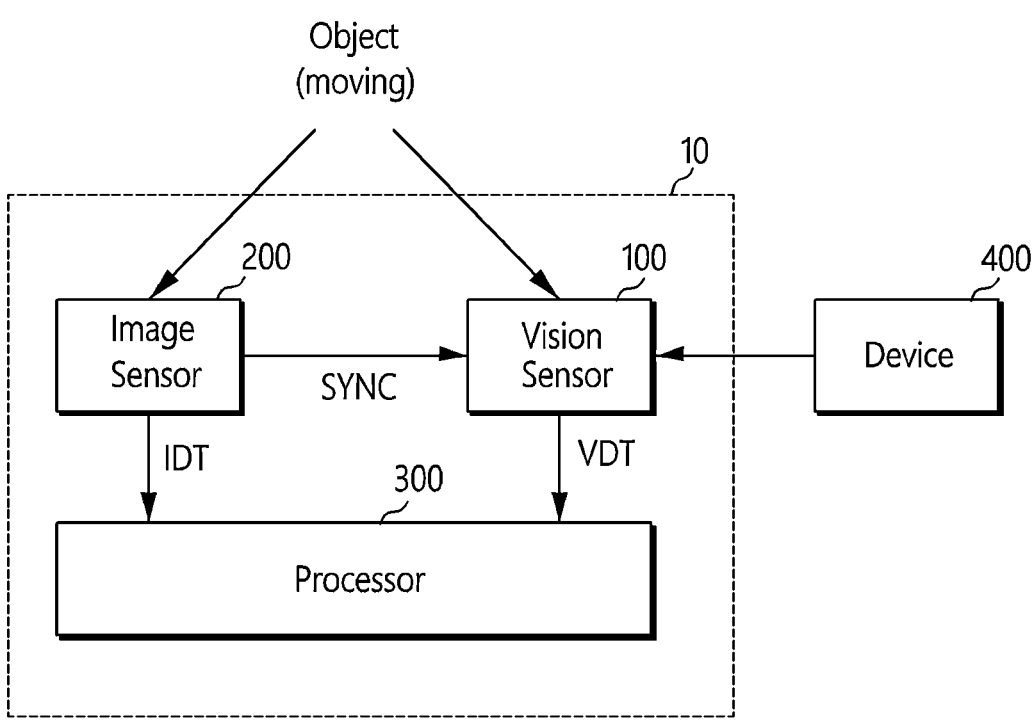
FIG. 1 is a block diagram showing an image processing device according to an embodiment of the present disclosure.

The embodiment described herein are example embodiments. The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The embodiments may be described and illustrated in terms of blocks, as shown in the drawings, which carry out a described function or functions. These blocks, which may be referred to herein as an integrator (e.g., an event integrator), a filter, a summer (a summation circuit), an edge detector, event bad pixel corrector, an event selector, an event signal processing unit, a column scanner, or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

A vision sensor and an image processing device thereof according to some embodiments of the disclosure will be described below with reference to FIGS. 1 to 18.

FIG. 1 is a block diagram showing an image processing device according to an embodiment of the present disclosure.

Referring to FIG. 1, an image processing device 10 may include a vision sensor 100, an image sensor 200 and a processor 300. The image processing device 10 according to embodiments of the present disclosure may be installed in an electronic apparatus having image or light sensing functions. For example, the image processing device 10 may be installed in the electronic apparatus such as a camera, a smart phone, a wearable device, an Internet of Things (IoT) device, a tablet PC (Personal Computer), a PDA (Personal Digital Assistant), a PMP (portable multimedia player), a navigation, a drone, and an advanced drivers assistance system (ADAS). Further, the image processing device 10 may be provided as a component in a vehicle, furniture, manufacturing equipment, doors, various measuring instruments, and the like.

The vision sensor 100 may be an event-based vision sensor. The vision sensor 100 may detect changes in the intensity of incident light and output an event signal. The vision sensor 100 may be a dynamic vision sensor that outputs the event signals with respect to pixels in which changes in intensity of light are detected, that is to say, pixels in which an event is detected or event information is stored. When an event in which intensity of light increases occurs, the vision sensor 100 may output an On-event corresponding thereto. In contrast, when there an event in which the intensity of light decreases occurs, the vision sensor 100 may output an Off-event. A change in intensity of light may be due to motion of an object captured by the vision sensor 100 or blinking (e.g., lighting, and display screen) of the object. Additionally, the change in intensity of light may be caused by the motion of the vision sensor 100 or the image processing device 10 itself. The vision sensor 100 may periodically or aperiodically transmit vision sensor data VDT, including event signals, to the processor 300.

The vision sensor 100 may be a frame-based vision sensor. For example, the vision sensor 100 may scan all the pixels forming the vision sensor 100 and output the event signals every reference cycle. However, unlike a general CMOS image sensor, the vision sensor 100 may not output event signals for all pixels, and may output event signals only for pixels in which changes in intensity of light are detected. In this case, the event signal that is output from the vision sensor 100 may be converted into a synchronous event signal by a processor or the like.

In an embodiment, the vision sensor 100 may transmit the vision sensor data VDT including image frame generated by the image sensor 200 and event signal generated by the vision sensor 100 to the processor 300 on the basis of synchronization signal SYNC received from the image sensor 200.

In another embodiment, the vision sensor 100 may generate a time stamp capable of matching the image frame generated by the image sensor 200 with the event signal generated by the vision sensor 100 on the basis of the synchronization signal SYNC received from the image sensor 200, and may transmit the vision sensor data VDT including the generated time stamp to the processor 300. The time stamp may include information about a time point at which the image sensor 200 is exposed, a time point at which the image frame is generated, or a time point at which the event signal of the vision sensor 100 is generated.

For example, the vision sensor 100 may transmit the vision sensor data VDT including information on whether an event occurs and an amount of change in illuminance caused by the event to the processor 300, using a self-initialization circuit and a counter included for each pixel of the vision sensor.

Also, the vision sensor 100 may output a device synchronization signal for synchronizing external devices including the image sensor 200 with the vision sensor 100, using a synchronization signal SYNC received from the image sensor 200 or an internal signal of the vision sensor 100. The vision sensor 100 may output a plurality of device synchronization signals, and may control the device synchronization signals individually.

The image sensor 200 may convert an optical signal of an object incident through an optical lens into an electrical signal, and may generate and output image sensor data IDT on the basis of the electrical signals. The image sensor 200 may include, for example, a pixel array including a plurality of pixels arranged two-dimensionally and a readout circuit, and the pixel array may convert received optical signals into electrical signals. The pixel array may be implemented as photoelectric conversion elements such as Charge Coupled Devices (CCD) or Complementary Metal Oxide Semiconductor (CMOS), and may also be implemented as various other types of photoelectric conversion elements. The readout circuit may generate raw data on the basis of the electrical signals provided from the pixel array, and output the raw data or raw data subjected to preprocessing such as bad pixel removal, as the image sensor data IDT. The image sensor 200 may be implemented as a semiconductor chip or package that includes a pixel array and a readout circuit.

The image sensor 200 may generate the synchronization signal SYNC that is transmitted to the vision sensor 100 to synchronize the vision sensor 100 and the image sensor 200. The synchronization signal SYNC may be generated in consideration of shutter signal information, readout signal information, image frame information, or the like of the image sensor 200.

The processor 300 may perform the image processing on the image sensor data IDT provided from the image sensor 200. For example, the processor 300 may include image processing for changing the data format on the image sensor data IDT (e.g., changing the image data of Bayer pattern to YUV or RGB format), and image processing for image quality improvement such as noise removal, brightness adjustment, and sharpness adjustment. The processor 300 may process the vision sensor data VDT received from the vision sensor 100, and detect the motion of object (or motion of object on the image perceived by the image processing device 10) on the basis of event signals in the vision sensor data VDT.

The processor 300 may match the image frame included in the image sensor data IDT provided from the image sensor 200 and the vision sensor data VDT received from the vision sensor 100, using the time stamp and synchronization signal information.

For example, the processor 300 may effectively apply algorithms (e.g., a CIS deblur (CMOS image sensor deblur algorithm) for removing a motion blur due to the motion of object in the image data, by matching the vision sensor data VDT including information on whether an event occurs and an amount of change in illuminance caused by the occurrence of event with the image sensor data IDT, using the time stamp and synchronization signal information.

The processor 300 may process signals detected by the vision sensor 100.

The processor 300 may include an application specific integrated circuit (ASIC), a field-programmable gate array (FPGA), a dedicated processor, a microprocessor, or the like. Alternatively, the processor 300 may include a general purpose processor. The processor 300 may refer to two or more processors that are stacked in one package or disposed in multiple packages. Thus, the processor 300 may refer to at least one processor.

A flicker power source periodically brightens and darkens, and the vision sensor 100 may detect the brightened flicker power source as an On-event and the darkened flicker power source as an Off-event. For example, since fluorescent lamps flicker at a frequency of 50 to 60 Hz, a time difference between the On-event and the Off-event has a certain time difference on the basis of the frequency. The vision sensor 100 may filter this frequency component to compensate for flicker noise, when the On/Off-events have the constant time difference. However, with this method alone, which is implemented in the related art, there is a risk that high frequency components higher than the flicker frequency component may be filtered together. That is, even signal components moving faster than the flicker frequency may be filtered together. Therefore, the signal components moving faster as well as flicker may be filtered together.

The image processing device 10 of the disclosure may improve its performance by detecting flicker in the data of pixels forming the vision sensor 100 and correcting the flicker (e.g., a flicker removal correction).

In an embodiment, the vision sensor 100, the image sensor 200, and the processor 300 may each be implemented as an integrated circuit (IC). For example, the vision sensor 100, the image sensor 200, and the processor 300 may be implemented as separate semiconductor chips. Alternatively, the vision sensor 100, the image sensor 200, and the processor 300 may be implemented as a single chip. For example, the vision sensor 100, the image sensor 200, and the processor 300 may be implemented as a system on chip (SoC).

The image processing device 10 may control the external device 400 and collect data. The image processing device 10 may match data collected from the device 400 using the time stamp. The device 400 may include an acceleration sensor, an inertial measurement unit (IMU), a gyro sensor, an infrared (IR) LED, a flash light, and the like.

Figure 2:
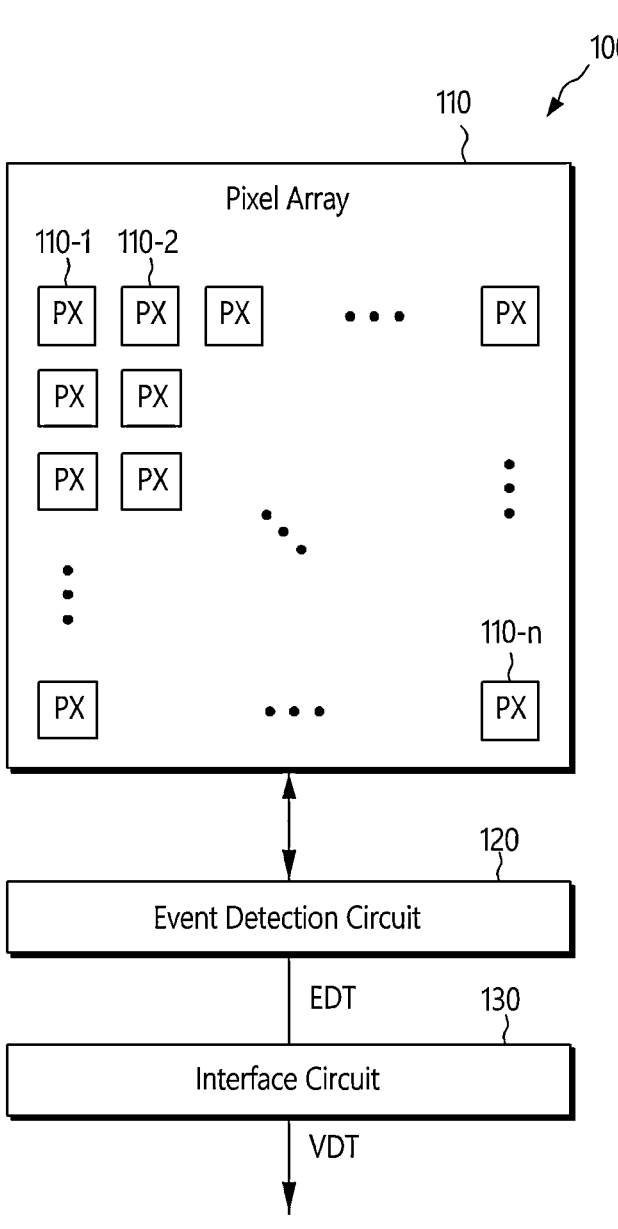
FIG. 2 is a block diagram showing a visual sensor according to an embodiment of the present disclosure.

FIG. 2 is a block diagram showing a visual sensor according to an embodiment of the present disclosure. Specifically, FIG. 2 is a block diagram showing the vision sensor 100 of FIG. 1.

Referring to FIGS. 1 and 2, the vision sensor 100 may include the pixel array 110, the event detection circuit 120, and the interface circuit.

The pixel array 110 may include a plurality of pixels PX (e.g., 110-1 to 110-n) placed in a matrix of i rows and j columns. Each of the plurality of pixels PX may generate an event signal by reducing events in which the intensity of incident light increases or decreases. For example, each of the plurality of pixels PX may be connected to the event detection circuit 120 through a column line extending in a column direction and a row line extending in a row direction. In an embodiment, a signal indicating that an event occurs and the polarity information about the event (that is, whether the event is an On-event in which intensity of light increases or an Off-event in which intensity of light decreases) may be output from the pixel PX in which the event occurs to the event detection circuit 120. In other embodiments, polarity information about the event may be omitted, and a signal indicating that an event occurs may be output from the pixel PX in which the event occurs to the event detection circuit 120.

The event detection circuit 120 may read event signals from the pixel array 110 and process the event signals. The event detection circuit 120 may generate event data EDT including the address of the pixel PX in which the event occurs. In an embodiment, the event data EDT may further include the polarity information about the event and time stamp, as well as the address of the pixel PX in which the event occurs. The event detection circuit 120 may process the events generated in the pixel array 110 in units of pixels PX, in units of pixel groups including a plurality of pixels PX, in units of columns or in units of frames. In an embodiment, the event detection circuit 120 may process k consecutive column units in one frame.

The event detection circuit 120 may include a column scanner circuit, a row event readout circuit, an Address Event Representation (AER), an event signal processing unit (hereinafter referred to as ESP), and a bias generator.

The column scanner circuit of the event detection circuit 120 may scan a plurality of pixels PX forming the pixel array in units of columns. Specifically, the column scanner circuit may transmit a selection signal to a column to be scanned among a plurality of columns of the pixel array, thereby scanning the pixels PX included in the column to be scanned.

The pixels PX in the column to be scanned may transmit the polarity information indicating presence or absence of an event in which intensity of light increases or decreases to the event readout circuit in response to the selection signal.

The row event readout circuit of the event detection circuit 120 may receive polarity information from the pixels PX included in the column to be scanned. The row event readout circuit may transmit an initialization signal INT to the pixel PX in which an event (e.g., an On-event or an Off-event) occurs in response to the polarity information. The pixel PX in which the event occurs may be initialized (e.g., reset) in response to the initialization signal INT.

The ESP of the event detection circuit 120 may generate event data EDT on the basis of the address ADDR, polarity information, and time stamp TS received from the AER.

The interface circuit 130 may receive event data EDT and transmit the vision sensor data VDT to the processor 300 according to a set protocol. The interface circuit 130 may pack the event data EDT and the time stamp in units of individual signals, in units of packets or in units of frames according to the set protocol to generate the vision sensor data VDT, and transmit the vision sensor data VDT to the processor 300. For example, the interface circuit 130 may include one of an AER interface, a Mobile Industry Processor Interface (MIPI) interface, and a parallel interface.

The packet including at least one event data EDT and the time stamp may be output from the interface circuit 130, as the vision sensor data VDT. The packet may include time stamp, address, and polarity information about the event data EDT, and the placement order thereof is not limited. A header notifying the start of the packet may be added to a front end, and a tail notifying the end of the packet may be added to a rear end of the packet. The packet may include at least one event signal.

Figure 3:
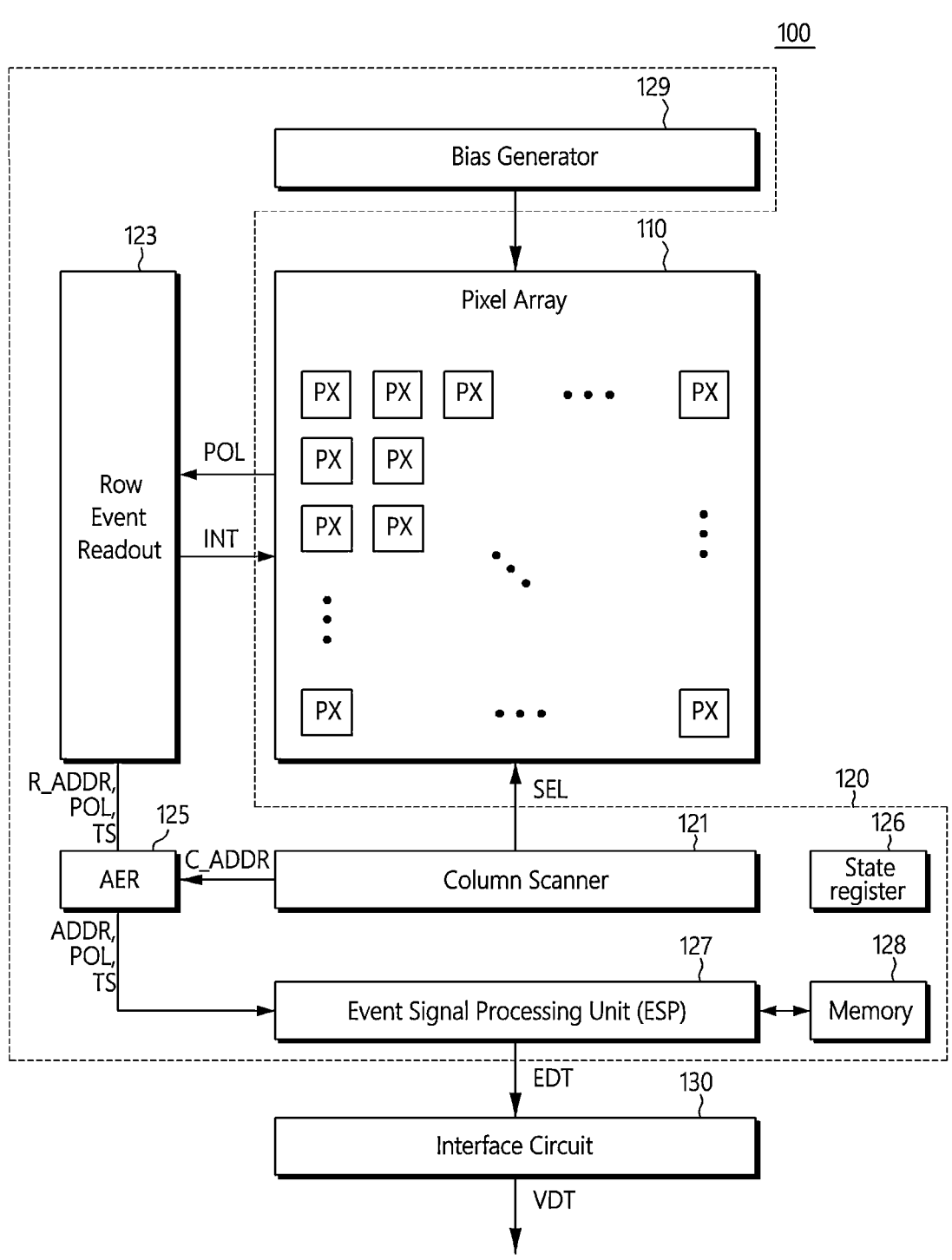
FIG. 3 is a block diagram specifically showing the vision sensor of FIG. 2.

FIG. 3 is a block diagram specifically showing the vision sensor of FIG. 2.

Referring to FIGS. 2 and 3, the vision sensor 100 includes a pixel array 110, an event detection circuit 120, and an interface circuit 130. The event detection circuit 120 may include a column scanner circuit 121, a row event readout circuit 123, an AER (Address Event Representation) 125, an event signal processing unit 127 (hereinafter referred to as ESP), a memory 128, and a bias generator 129. The vision sensor 100 may further include components such as an event rate controller that controls the event detection rate. Since the pixel array 110 and the interface circuit 130 are described with reference to FIG. 2, repeated description will not be provided.

The column scanner circuit 121 may scan a plurality of pixels PX forming the pixel array 110 in units of columns. Specifically, the column scanner circuit 121 may transmit the selection signal SEL to the column to be scanned among the columns of the pixel array 110, thereby scanning the pixels PX included in the column to be scanned.

The pixels PX included in the column to be scanned may transmit polarity information POL indicating presence or absence of an event in which the intensity of light of increases or decreases to the row event readout circuit 123 in response to the selection signal SEL. The polarity information POL may include information about On-event in which intensity of light increases and Off-event in which intensity of light decreases. The polarity information POL may be made up of 1-bit including information about whether an On-event occurs and 1-bit including information about whether an Off-event occurs. In some embodiments, the pixels PX included in the columns to be scanned may transmit information about presence or absence of an event in which the intensity of light of increases or decreases to the event readout circuit 123 in response to the selection signal SEL, except for the polarity information POL. On the other hand, the implementation method of the polarity information POL is not limited to the above example, and may be implemented in various methods. The column scanner circuit 121 may generate the column address C_ADDR of the pixel PX in which the event occurs.

The row event readout circuit 123 may receive information about presence or absence of an event in which the intensity of light of increases or decreases from the pixels PX included in the column to be scanned. Specifically, the row event readout circuit 123 may receive the polarity information POL or information about whether an event occurs from the pixels PX included in the column to be scanned. The row event readout circuit 123 may transmit the initialization signal INT to the pixel PX in which the event (e.g., On-event or Off-event) occurs, in response to the polarity information POL or information about whether the event occurs. The pixel PX in which an event occurs may be initialized (e.g., reset) in response to the initialization signal INT. In addition, the row event readout circuit 123 may generate the row address R_ADDR of the pixel PX in which the event occurs on the basis of the received polarity information POL or information about whether an event occurs. Also, the row event readout circuit 123 may generate a time stamp TS including information about the time at which the event occurs, on the basis of the polarity information POL or information about whether the event occurs. In some embodiments, the time stamp TS may be generated by a time stamper provided in the row event readout circuit 123. For example, the time stamper may be implemented, using a timetick generated in units of some to dozens of microseconds.

The AER 125 may receive row address R_ADDR, polarity information POL (or information about whether an event occurs) and time stamp TS from the row event readout circuit 123, and receive column address C_ADDR from the column scanner circuit 121. Further, the AER 125 may generate the address ADDR of the pixel PX in which the event occurs, on the basis of the row address R_ADDR and the column address C_ADDR. The AER 125 may transmit the address ADDR, the polarity information POL, and the time stamp TS to the ESP 127.

The ESP 127 may generate event data EDT on the basis of the address ADDR, the polarity information POL, and the time stamp TS received from the AER 125. In an embodiment, the ESP 127 may generate event data EDT for valid events. In addition, the ESP 127 identifies flicker among events in which the intensity of light changes, and generates valid event data EDT for valid events along with correction for removing the event signals corresponding to the flicker. The flicker refers to a phenomenon (e.g., a flickering phenomenon) in which the intensity of light periodically changes, by light emitted from peripheral lighting device of an image processing system, external electronic device including a display, or the like.

The ESP 127 may map a status of event presence or absence of each of the plurality of pixels and store them in the memory 128. For example, as described in FIG. 5, the ESP 127 may map the status when an event occurs in the pixel (ON Event) as a first status, map the status when an event does not occur (OFF Event) as a second status and store them in the memory 128, and may not store them in the memory when an event does not occur (NON Event). However, the embodiment of the present disclosure is not limited thereto, and the ESP 127 may map the status of event presence or absence of each of a plurality of pixels, and store them in a status register that forms the ESP 127. The status register may be made up of column registers.

The bias generator 129 may generate the voltages that are provided to the pixel array 110. For example, the bias generator 129 may generate threshold voltages or bias voltages used to detect On-event and Off-event in the pixel PX. The bias generator 129 may change the voltage level of the threshold voltage supplied to the pixel PX, and may change the voltage level of the threshold voltage differently for each pixel PX.

Figure 4:
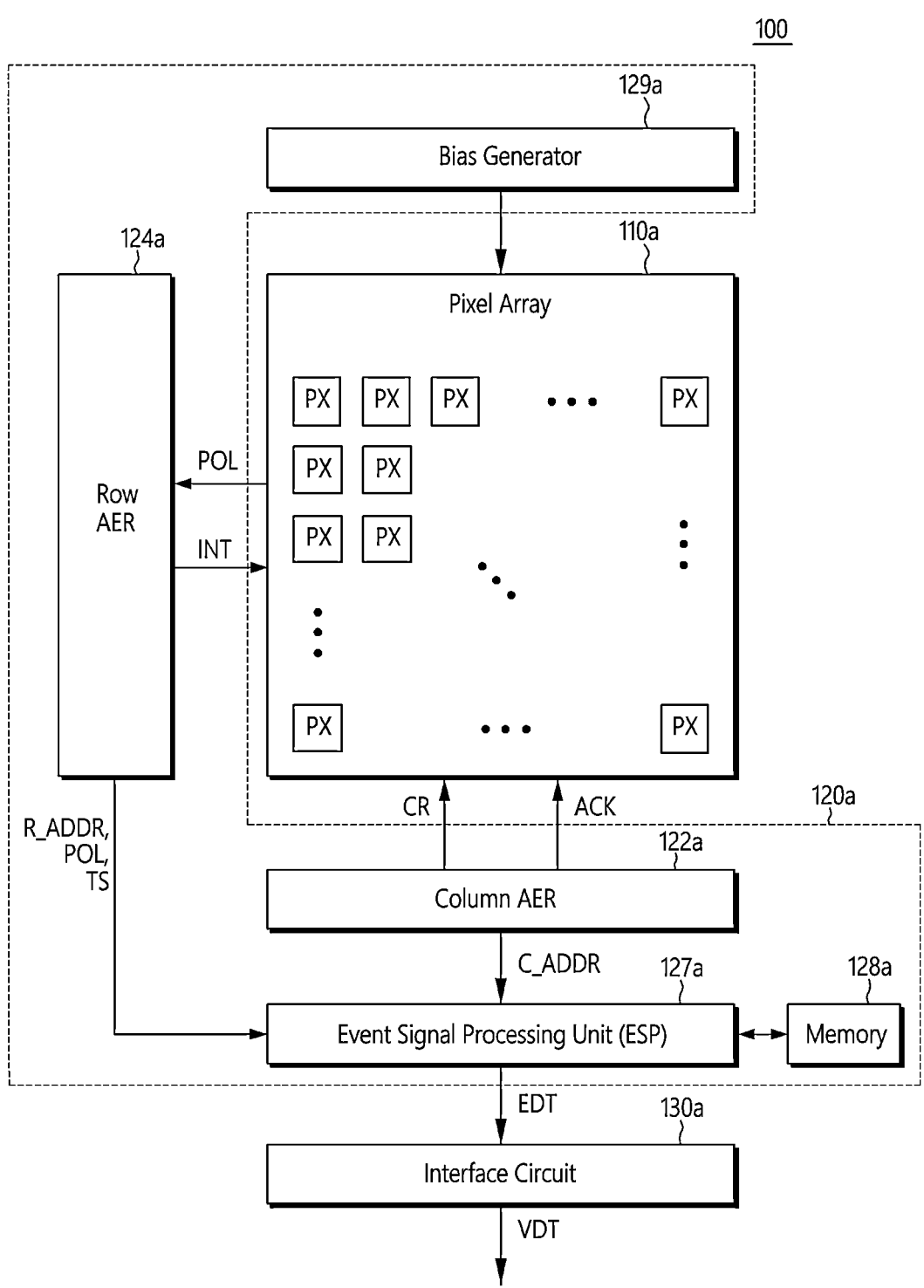
FIG. 4 is a block diagram specifically showing the vision sensor of FIG. 2.

FIG. 4 is a block diagram specifically showing the vision sensor of FIG. 2.

The vision sensor 100a of FIG. 4 is a modifiable embodiment of the vision sensor 100 of FIG. 3. Referring to FIG. 4, the vision sensor 100a includes a pixel array 110a, an event detection circuit 120a, and an interface circuit 130a, and the event detection circuit 120a may include a column AER 122a, a row AER 124a, a bias generator 129a, an ESP 127a, and a memory 128a. The vision sensor 100a may further include components such as an event rate controller that controls the event detection rate.

Since the pixel array 110a and the interface circuit 130a may correspond to the pixel array 110 and the interface circuit 130 of FIG. 2, repeated description will not be provided. Since the bias generator 129a may correspond to the bias generator 129 of FIG. 3, repeated description will not be provided.

According to an embodiment of the present disclosure, a pixel PX that senses an event (e.g., an On-event or an Off-event) among the plurality of pixels PX that make up the pixel array 110a may transmit a column request CR that is a signal indicating that the event occurs to the column AER 122a.

The column AER 122a may receive the column request CR from the pixel PX in which the event occurs. The column AER 122a may transmit the response signal ACK to the pixel PX in which the event occurs, in response to the received column request CR. The column AER 122a may also generate the column address C_ADDR of the pixel PX in which the event occurs, on the basis of the received column request CR.

The pixel PX in which the event occurs may transmit polarity information POL to the row AER 124a in response to the response signal ACK. Since an embodied example of the polarity information POL may be substantially the same as the content described above with reference to FIG. 3, repeated description will not be provided.

The row AER 124a may receive polarity information POL from the pixel PX in which the event occurs. The row AER 124a may transmit the initialization signal INT to the pixel PX in which the event occurs in response to the polarity information POL. The pixel PX in which the event occurs may be initialized (e.g., reset) in response to the initialization signal INT. Also, the row AER 124a may generate the row address R_ADDR of the pixel PX in which the event occurs, on the basis of the received polarity information POL. The row AER 124a may also generate a time stamp TS including information about the time at which the event occurs, on the basis of the polarity information POL. In some embodiments, the time stamp TS may be generated by a time stamper provided in the row AER 124a. For example, the time stamper may be implemented using timetick generated on the order of some to dozens of microseconds.

With respect to FIG. 4, the operation of the row AER 124a and the column AER (122a) was explained, assuming that information about event occurrence (e.g., column request CR and polarity information POL) is read from the pixel array 110a on a column-basis. However, the operation of the row AER 124a and the column AER 122a is not limited thereto, and the row AER 124a and the column AER 122a may read information about event occurrence from the pixels PX in which the event occurs in various ways. For example, information about the event occurrence may be read from the pixel array 110a on a row-basis, and the operation of the row AER 124a and the column AER 122a may be replaced, that is, the column AER 122a may receive the polarity signal POL and transmit the initialization signal INT to the pixel array 110a. In addition, the row AER 124a and the column AER 122a may individually access the pixel PX in which the event occurs.

The ESP 127a may generate the event data EDT, by identifying and removing the flicker on the basis of at least one of column address C_ADDR, row address R_AEER, degree of event occurrence, polarity information POL or time stamp TS received from the row AER 124a and the column AER 122a. However, in the case of identifying/removing the flicker using the time stamp TS (32-bit size) when implementing with a resolution of 640×480, there is a problem of requirement for separate memory (e.g., SRAM) of "640×480×2×32 bits", that is, 19.66 M bits.

The vision sensor according to embodiments of the present disclosure can provide the effect of generate the valid event data with minimum volume to improve the performance of the image processing system, by identifying and removing presence or absence of the flicker occurrence and event occurrence, on the basis of accumulated images stored in the memory 128.

Figure 5:
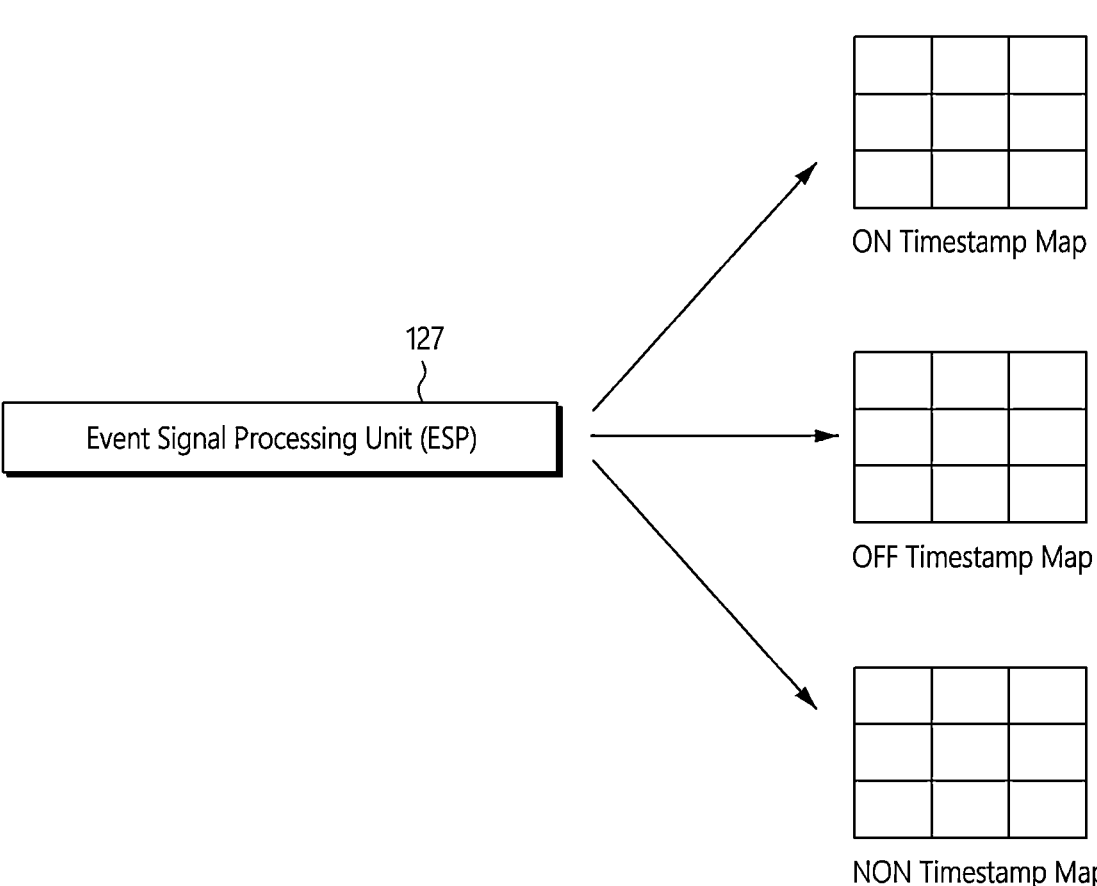
FIG. 5 shows a status map stored in the memory.

FIG. 5 shows a status map stored in the memory.

The memory described above in FIGS. 3 and 4 may store the status map. For example, the memory 128 may store a first status (On-event) output from the ESP 127 as logic high, and may store a second status (Off-event) as logic low, as shown in FIG. 5. The memory 128 may maintain previously stored values for pixels in which no On-event or Off-event occurs, until reset. The memory may be made up of flip-flops of the same number as the plurality of pixels. The status map has 1-bit data per pixel, because it only indicates whether an event occurs in the pixel.

Figure 6:
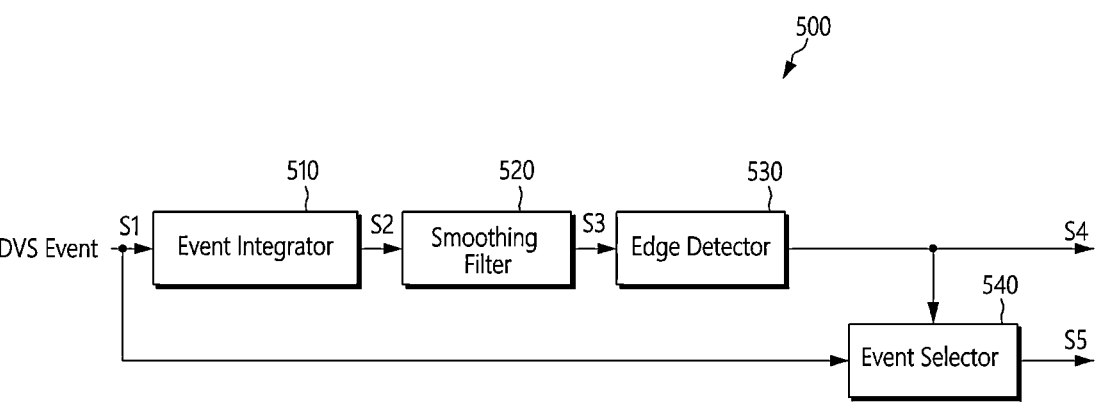
FIG. 6 is a block diagram that specifically shows the ESP of FIG. 3 according to some embodiments.

FIG. 6 is a block diagram that specifically shows the ESP of FIG. 3 according to some embodiments.

The ESP 127 of FIG. 3 may be implemented like the ESP 500 of FIG. 6 according to some embodiments. For example, the ESP 500 may include an event integrator 510, a filter 520, an edge detector 530, and an event selector 540.

When receiving the (raw) event signal (DVS event, S1) from the pixel array 110, the event integrator 510 accumulates and stores the raw event signal S1 during a preset time. For example, the event integrator 510 includes the memory 128, generates accumulated event data S2 on the basis of the accumulated raw event signal, and stores the accumulated event data S2 in the memory 128.

The memory 128 may be a 1-bit memory array that stores event statuses indicating whether an event occurs for each of a plurality of pixels in the pixel array on the basis of raw event signal S1, according to some embodiments. Alternatively, the memory 128 may be a two-bit memory array that includes a first memory that stores event statuses indicating whether an event occurs for each of a plurality of pixels in the pixel array on the basis of the raw event signal S1 according to some embodiments, and a second memory that stores event statuses indicating whether a flicker occurs for each of the plurality of pixels in the pixel array. A specific example of the memory will be described in detail with reference to FIGS. 8 and 9.

The event integrator 510 may adjust the accumulation time for the accumulated event data S2 on the basis of the reset signal. According to some embodiments, the event integrator 510 may set a preset time corresponding to the accumulation period on the basis of the reset signal. The preset time according to some embodiments may be a time of cycle or more according to the flicker frequency of the light source. For example, if the cycle according to the flicker frequency is 1 ms, the raw event signal may be accumulated during a time of 1 ms or more. For example, it may be accumulated during the time from 16 ms to 20 ms. The above flicker cycles are only numerical examples for explanation, and the disclosure is not limited to the above numerical examples.

In an embodiment, considering various flicker light sources according to some embodiments, the event integrator 510 may define the default reset signal according to the flicker cycle determined to be flicker to adjust the preset time corresponding to the accumulation period, and may adjust the accumulation period, i.e., the preset time, when a flicker signal of another light source is detected within the preset time that is set previously.

Error pixels may exist among the plurality of pixels included in the pixel array 110. The error pixels may be defective pixels that occur during the vision sensor 100 process, or may be defective pixels that occur due to errors that occur during operation of the vision sensor 100.

The filter 520 may perform the pixel correction on the accumulated event data S2 accumulated during a preset time and stored in the memory 128. For example, the pixel values of the error pixels may be corrected, by scanning the accumulated event data with a window of size smaller than the pixel array. According to some embodiments, the window includes a plurality of adjacent pixels centered on the error pixel. For example, the window may be a 3×3 array, a 5×5 array, a 7×7 array, and the like.

The filter 520 scans all pixels of the accumulated event data S1 with a window, and performs the pixel correction on the error pixel if there is an error pixel. A corrected pixel value may be generated on the basis of the pixel values of the peripheral pixels adjacent to the error pixel, and may be replaced with the pixel value of the error pixel. For example, the pixel correction is output, by performing a smoothing filtering according to the pixel values of the peripheral pixel (S3).

The edge detector 530 detects edges in the pixel-corrected accumulated event data S3. Since the motion of an object is better captured at an edge than at a plane, edge-detected accumulated event data S4 is generated in the pixel-corrected accumulated event data S3.

The event selector 54 may compare the raw event data S1 with the edge-detected accumulated event data S4 to extract valid event data S5. For example, by comparing the raw event signal S1 with the edge-detected accumulated event data S4, overlapping event occurrence signals may be determined as a flicker. By comparing the raw event signal S1 with the edge-detected accumulated event data S4, signals that do not overlap may be determined as a valid event.

The ESP 500 resets the accumulated event data stored in the memory 128 on the basis of the reset signal, accumulates the raw event occurrence signal S1 during the next preset time to generate accumulated event data S2, performs window-scanning on the error pixels to perform the correction (S3), and performs the edge detection (S4). The ESP 500 compares the pixel-corrected or edge-detected accumulated event data with the raw event occurrence signal to generate valid event data S5 of the next cycle.

Figure 7:
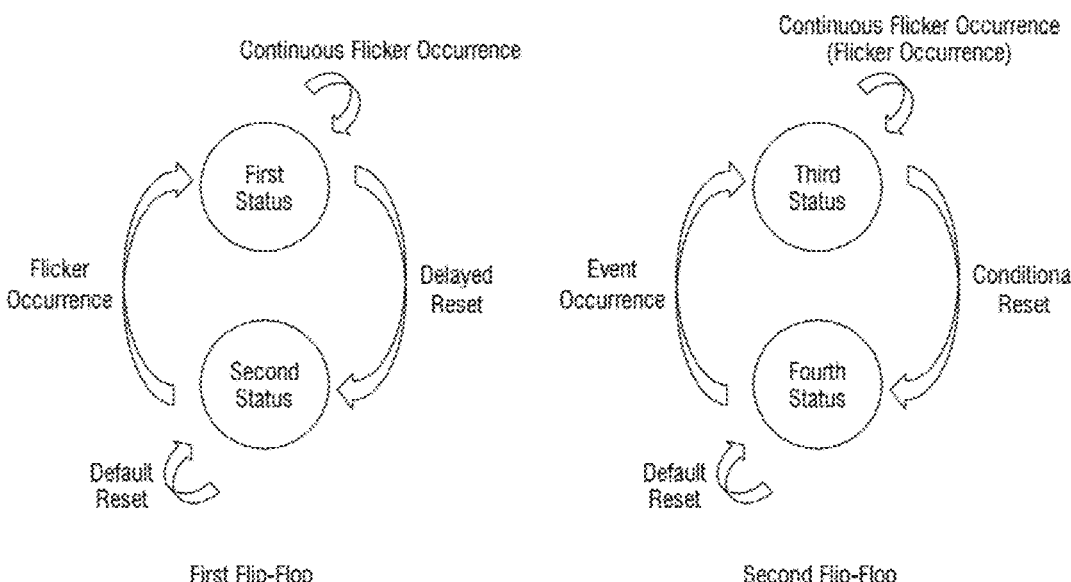
FIG. 7 is a status diagram showing an event status and a flicker status of each of a plurality of pixels in a visual sensor according to an embodiment of the present disclosure.

FIG. 7 is a status diagram showing an event status and a flicker status of each of a plurality of pixels in a visual sensor according to an embodiment of the present disclosure.

Specifically, FIG. 7 is a status diagram which shows the flicker status and event status of each of the plurality of pixels PX, by identifying the presence or absence of flicker occurrence and the event occurrence of each of the plurality of pixels PX that constitute the pixel array 110.

When another event that occurs regardless of the polarity of the event exists within a specified period (e.g., one reset cycle) prior to detection of a target event due to the motion of object by the EDC 120 of FIG. 2 in FIG. 7, it is assumed that the EDC 120 identifies the target event as flicker. That is, when the event signal continuously occurs regardless of the polarity of the event within a specified period (e.g., one reset cycle), it may be identified as flicker.

Referring to FIG. 7, the EDC 120 of the vision sensor 100 includes a status register 126, the status register 126 may include a first flip-flop which stores first data indicating whether a flicker occurs, and a second flip-flop which stores second data indicating whether an event occurs. The first flip-flop may be implemented as a 1-bit flip-flop (e.g., delayed flip-flop), and the second flip-flop may be implemented as a 1-bit flip-flop.

In an embodiment, the EDC 120 may identify whether a flicker of a target pixel among a plurality of pixels occurs. For example, when it is identified that a flicker occurs in the target pixel, the EDC 120 may store first data obtained by mapping the target pixel to a first status corresponding to the occurrence of flicker in the first flip-flop. On the other hand, when it is identified that no flicker occurs in the target pixel, the EDC 120 may store first data obtained by mapping the target pixel to a second status corresponding to no flicker occurrence in the first flip-flop. For example, the first flip-flop may store a first status to a logic high (e.g., "1" which is a 1-bit logic status) and may store a second status to a logic low (e.g., 0" which is the 1-bit logic status). The status register 126 may be made up of the first flip-flops of the same number as the plurality of pixels.

In an embodiment, the EDC 120 may reset the first data by transmitting a first reset signal for resetting the first data every preset reset cycle to the first flip-flop. At this time, the EDC 120 may perform a delayed reset when the target pixel is in the first status, and may perform a default reset (e.g., initialization/reset the flicker status of the target pixel to "0") when the target pixel is in the second status. Here, the 'delayed reset' may mean that performs the reset, by delaying the cycle to the next cycle after the cycle at which the first reset signal is received by the first flip-flop. For example, the data (e.g., first data) regarding the flicker status of the target pixel stored in the first flip-flop may be reset to the next reset cycle of the cycle at which the first reset signal is received from the EDC 120 according to a delayed reset (e.g., 1-clock delayed reset). The EDC 120 has an advantage of being able to identify the flicker (e.g., flicker or the like due to light-up of the peripheral lighting) in which change in brightness of light changes at a relatively long cycle through the delayed rest on the first data of the target pixel. In addition, when performing the delayed reset by adjusting the reset signal according to the flicker cycle determined to be a flicker, a preset time corresponding to the accumulated cycle may be adjusted by the delayed amount.

For example, when a preset first cycle passes, the EDC 120 generates a first reset signal of reset signal of a second cycle and transmits the first reset signal to the first flip-flop, and the first flip-flop may perform the delayed reset which resets the first data to a third reset cycle, which is a cycle next to the cycle at which the first reset signal of the signal of the second cycle is received. However, when a different flicker signal occurs in the second reset cycle, the first flip-flop does not perform the delayed reset and may maintain the first data, despite the first reset signal of the reset signal 820 of the second cycle.

In an embodiment, the EDC 120 may identify whether an event of the target pixel among a plurality of pixels occurs. For example, when it is identified that an event occurs at the target pixel, the EDC 120 may store second data obtained by mapping the target pixel to a third status corresponding to the event occurrence in the second flip-flop. On the other hand, when it is identified that no event occurs at the target pixel, the EDC 120 may store second data obtained by mapping the target pixel to a fourth status corresponding to no event occurrence in the second flip-flop. For example, the first flip-flop may store the third status as logic high, and may store the fourth status as logic low. The status register 126 may be made up of the second flip-flops of the same number as the plurality of pixels.

In an embodiment, the EDC 120 may reset the second data, by transmitting a second reset signal for resetting the second data every preset reset cycle to the second flip-flop. At this time, if the target pixel is in the third status, the EDC 120 performs reset depending on conditions (hereinafter referred to as "conditional reset"), and may perform a default reset (e.g., the event status of the target pixel is initialized/reset to '0') when the target pixel is in the fourth status.

The data (e.g., second data) about the event status of the target pixel stored in the second flip-flop may be reset at the cycle at which the second reset signal is received from the EDC 120 when the first and second conditions are satisfied. Here, "first condition" means reception of the reset signal from the EDC 120, and "second condition" means that the status of the first flip-flop is in the second status (e.g., a status in which no flicker of the target pixel occurs) when the reset signal is received.

Although FIG. 7 describes that the status register 126 is made up of a first flip-flop and a second flip-flop to identify and store the flicker occurrence status and the event occurrence status of the target pixel, the embodiment is not limited thereto, the status register 126 of the EDC 120 according to the embodiment of the present disclosure is made up of various modules including a counter, a memory (e.g., SRAM, DRAM) to identify and store the flicker occurrence status and the event occurrence status of the target pixel.

Figure 8:
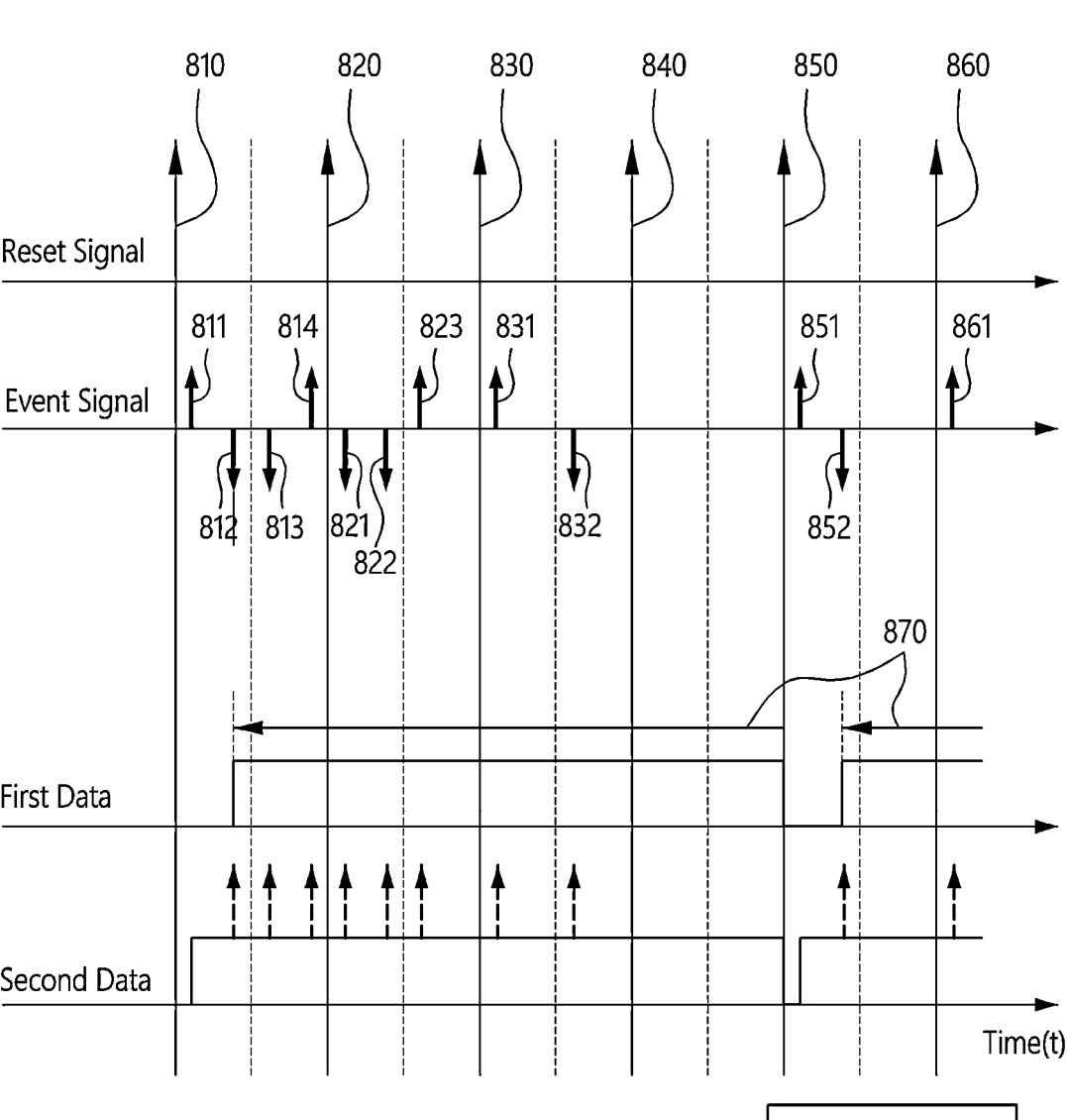
FIG. 8 shows a timing diagram of the operation of storing the event status and flicker status of FIG. 7 by the vision sensor according to one embodiment of the present disclosure.

FIG. 8 shows a timing diagram of the operation of storing the event status and flicker status of FIG. 7 by the vision sensor according to one embodiment of the present disclosure.

Specifically, FIG. 8 is a timing diagram of the first data stored in the first flip-flop of the status register 126 and the second data stored in the second flip-flop of the status register 126 of FIG. 7.

The EDC 120 may generate a reset signal and transmit it to the first flip-flop and the second flip-flop when a preset reset cycle passes. At this time, the reset signal may include a first reset signal to reset the first data of the first flip-flop, and a second reset signal to reset the second data of the second flip-flop. The reset cycle means a period from the reception time point of the reset signal before the reception time point of the next reset signal. For example, the first reset cycle may mean from the reception time point of the reset signal 810 before the reception time point of the reset signal 820 of the second cycle, and the second reset cycle may mean from the reception time point of the reset signal 820 of the second cycle before the reception time point of the reset signal 830 of the third cycle.

Referring to FIG. 8, a horizontal axis of the timing diagram represents time (t), and a vertical axis may include the status of the reset signal of the target pixel, the status of the event signal, the first data that stores the flicker occurrence status, and second data that stores the event occurrence status. Solid arrows of the timing diagram means an occurrence of event signals, and dotted arrows means an occurrence of flicker.

Referring to FIGS. 7 and 8, the EDC 120 may detect the occurrence of the first event signal 811 to the fourth event signal 814 during the first reset cycle (for example: it means the period from the reception time point of the reset signal 810 of the first cycle before the reception time point of the reset signal 820 of the second cycle). When the first event signal 811 is generated, the EDC 120 changes the status of the second data from a fourth status (e.g., a logic low status) to a third status (e.g., a logic high status) and may store it in the second flip-flop. When the second event signal 812 is generated, the EDC 120 may change the status of the first data from a second status (e.g., a logic low status) to a first status (e.g., a logic high status) and store it in the first flip-flop, and may maintain the status of second data in the third status (e.g., a logic high status) and store it in the second flip-flop. When the third event signal 813 is generated, the EDC 120 may maintain the status of the first data in the first status (e.g., logic high status) and store it in the first flip-flop, and may maintain the status of the second data in the third status (e.g., logic high status) and store it in the second flip-flop. When the fourth event signal 814 is generated, the EDC 120 may maintain the status of the first data in the first status (e.g., logic high status) and store it in the first flip-flop, and may maintain the status of the second data in the third status (e.g., logic high status) and store it in the second flip-flop.

When a preset first reset cycle passes, the EDC 120 generates a reset signal of second cycle (e.g., first reset signal) 820 and transmits it to the first flip-flop, and the first flip-flop may perform delayed reset of the first data at a third reset cycle (e.g., the reception time point of the reset signal 830 of the third cycle), which is a cycle next to the cycle at which the reset signal of the second cycle (e.g., the first reset signal) 820 is received. That is, when the reset signal is adjusted depending on the flicker cycle to perform the delayed reset, the event integrator 510 of FIG. 6 may adjust the preset time corresponding to the accumulation cycle by the delayed amount to accumulate the event signal.

However, since a different flicker signal occurs at the first reset cycle, the first flip-flop does not perform a delayed reset despite the reset signal (e.g., the first reset signal) 810 of the first cycle, and may maintain the first data.

When a preset first reset cycle passes, the EDC 120 generates a reset signal of second cycle (e.g., a second reset signal) 820 and transmits it to the second flip-flop. Because the status of the first flip-flop is not in the fourth status (e.g., logic low status) at the reception time point of the reset signal of the second cycle (e.g., second reset signal) 820 (i.e., condition of conditional reset is not satisfied), the second data may be maintained without performing the reset.

The EDC 120 may detect the occurrence of a fifth event signal 821 to a seventh event signal 823 during the second reset cycle (for example: it means the period from the reception time point of the reset signal 820 of the second cycle before the reception time point of the reset signal 830 of the third cycle). When the fifth event signal 821 is generated, the EDC 120 may maintain the status of the first data in the first status (e.g., logic high status) and store it in the first flip-flop, and may maintain the status of the second data in the third status (e.g., logic high status) and store it in the second flip-flop. When the sixth event signal 822 is generated, the EDC 120 may maintain the status of the first data in the first status (e.g., logic high status) and store it in the first flip-flop, and may maintain the status of the second data in the third status (e.g., logic high status) and store it in the second flip-flop. When the seventh event signal 823 is generated, the EDC 120 may maintain the status of the first data in the first status (e.g., a logic high status) and store it in the first flip-flop, and may maintain the status of the second data in a third status (e.g., logic high status) and store it in the second flip-flop.

When the preset second reset cycle passes, the EDC 120 generates a reset signal of third cycle (e.g., first reset signal) 830 and transmits it to the first flip-flop, and the first flip-flop may perform delayed reset of the first data at the fourth reset cycle (e.g., the reception time point of the reset signal 830 of the fourth cycle), which is a cycle next to the cycle at which the reset signal of the third cycle (e.g., the first reset signal) 830 is received.

However, since a different flicker signal occurs at the second reset cycle, the first flip-flop may maintain the first data without performing the delayed reset, despite the reset signal (e.g., the first reset signal) 820 of the second cycle.

When the preset second reset cycle passes, the EDC 120 generates a reset signal of third cycle (e.g., a second reset signal) 830 and transmits it to the second flip-flop. Because the status of the first flip-flop is not in the fourth status (e.g., logic low status) at the reception time point of the reset signal of the third cycle (e.g., second reset signal) 830 (i.e., condition of conditional reset is not satisfied), the second data may be maintained without performing the reset.

The EDC 120 may detect the occurrence of an eighth event signal 831 to a ninth event signal 832 during a third reset cycle (for example: it means the period from the reception time point of the reset signal 830 of the third cycle before the reception time point of the reset signal 840 of the fourth cycle). When the eighth event signal 831 is generated, the EDC 120 may maintain the status of the first data in the first status (e.g., logic high status) and store it in the first flip-flop, and may maintain the status of the second data in the third status (e.g., logic high status) and store it in the second flip-flop. When the ninth event signal 832 is generated, the EDC 120 may maintain the status of the first data in the first status (e.g., logic high status) and store it in the first flip-flop, and may maintain the status of the second data in the third status (e.g., logic high status) and store it in the second flip-flop.

When a preset third reset cycle passes, the EDC 120 may generate a reset signal 840 (e.g., first reset signal) of the fourth cycle and transmit it to the first flip-flop, and the first flip-flop may perform delayed reset of the first data at a fifth reset cycle (e.g., the reception time point of the reset signal 850 of the fifth cycle), which is a cycle next to the cycle at which the reset signal (e.g., the first reset signal) 840 of the fourth cycle is received.

However, since a different flicker signal occurs at the third reset cycle, the first flip-flop may maintain the first data, without performing the delayed reset, despite the reset signal (e.g., the first reset signal) 820 of the third cycle.

When the preset second reset cycle passes, the EDC 120 generates a reset signal (e.g., the second reset signal) 840 of the fourth cycle and transmits it to the second flip-flop. Because the status of the first flip-flop is not in the fourth status (e.g., logic low status) at the reception time point of the reset signal (e.g., second reset signal) 840 of the fourth cycle (i.e., condition of conditional reset is not satisfied), the second data may be maintained without performing the reset.

The EDC 120 may not detect the occurrence of the event signal during a fourth reset cycle (for example: it means the period from the reception time point of the reset signal 840 of the fourth cycle before the reception time point of the reset signal 850 of the fifth cycle). The EDC 120 may maintain the first data and second data of the third reset cycle which is the previous cycle due to the delayed reset and conditional reset.

When a preset fourth reset cycle passes, the EDC 120 generates a reset signal of fifth cycle (e.g., first reset signal) 850 and transmits it to the first flip-flop, and the first flip-flop may perform delayed reset of the first data at a sixth reset cycle (e.g., the reception time point of the reset signal 860 of the sixth cycle), which is a cycle next to the cycle at which the reset signal (e.g., the first reset signal) 850 of the fifth cycle is received.

On the other hand, in the case of the fourth reset cycle, since no other flicker signal occurred during the fourth reset cycle, the first flip-flop may perform delayed reset of the first data and change it to the fourth status at a fifth reset cycle (e.g., the reception time point of the first reset signal 850) according to the reset signal 840 of the fourth cycle (e.g., the first reset signal 840).

When a preset fourth reset cycle passes, the EDC 120 generates a reset signal (e.g., a second reset signal) 850 of the fifth cycle and transmits it to the second flip-flop. Because the status of the first flip-flop is in the fourth status (e.g., logic low status) at the reception time point of the reset signal (e.g., second reset signal) 850 of the fifth cycle (i.e., condition of conditional reset is satisfied), the second flip-flop may reset the second data and change it to the second status.

The EDC 120 may detect the occurrence of a tenth event signal 851 to an eleventh event signal 852 during a fifth reset cycle (for example: it means the period from the reception time point of the reset signal 850 of the fifth cycle before the reception time point of the reset signal 860 of the sixth cycle). When the tenth event signal 851 is generated, the EDC 120 changes the status of the second data from the fourth status (e.g., logic low status) to the third status (e.g., logic high status) and may store it in the second flip-flop. When the eleventh event signal 852 is generated, the EDC 120 may change the status of the first data from the second status (e.g., logic low status) to the first status (e.g., logic high status) and store it in the first flip-flop, and may maintain the status of second data in the third status (e.g., logic high status) and store it in the second flip-flop.

When a preset fifth reset cycle passes, the EDC 120 generates a reset signal (e.g., first reset signal) 860 of the sixth cycle and transmits it to the first flip-flop, and the first flip-flop may perform delayed reset of the first data at a seventh reset cycle (e.g., the reception time point of the reset signal of the seventh cycle), which is a cycle next to the cycle at which the reset signal (e.g., the first reset signal) 860 of the sixth cycle is received.

However, since a different flicker signal occurs at the fifth reset cycle, the first flip-flop may maintain the first data without performing the delayed reset, despite the reset signal (e.g., the first reset signal) 850 of the fifth cycle.

When the preset fifth reset cycle passes, the EDC 120 generates a reset signal (e.g., a second reset signal) 860 of the sixth cycle and transmits it to the second flip-flop. Because the status of the first flip-flop is not in the fourth status (e.g., logic low status) at the reception time point of the reset signal (e.g., second reset signal) 860 of the sixth cycle (i.e., condition of conditional reset is not satisfied), the second flip-flop may maintain the second data, without performing the reset.

The EDC 120 may detect the occurrence of a twelfth event signal 861 during the sixth reset cycle (for example: it means the period from the reception time point of the reset signal 860 of the sixth cycle before the reception time point of the reset signal of the seventh cycle). When the twelfth event signal 861 is generated, the EDC 120 may maintain the status of the first data in the first status (e.g., logic high status) and store it in the first flip-flop, and may maintain the status of the second data in the third status (e.g., logic high status) and store it in the second flip-flop.

The EDC 120 may identify a portion 870 of the first data corresponding to the first status, which is a logic high status, as a status in which a flicker occurs in the target pixel. The EDC 120 compares the first data with the second data, and removes the data of the portion (e.g., the flicker occurrence portion) 870 of the second data corresponding to the first status of the first data to generate event data EDT of the valid events.

Figure 9:
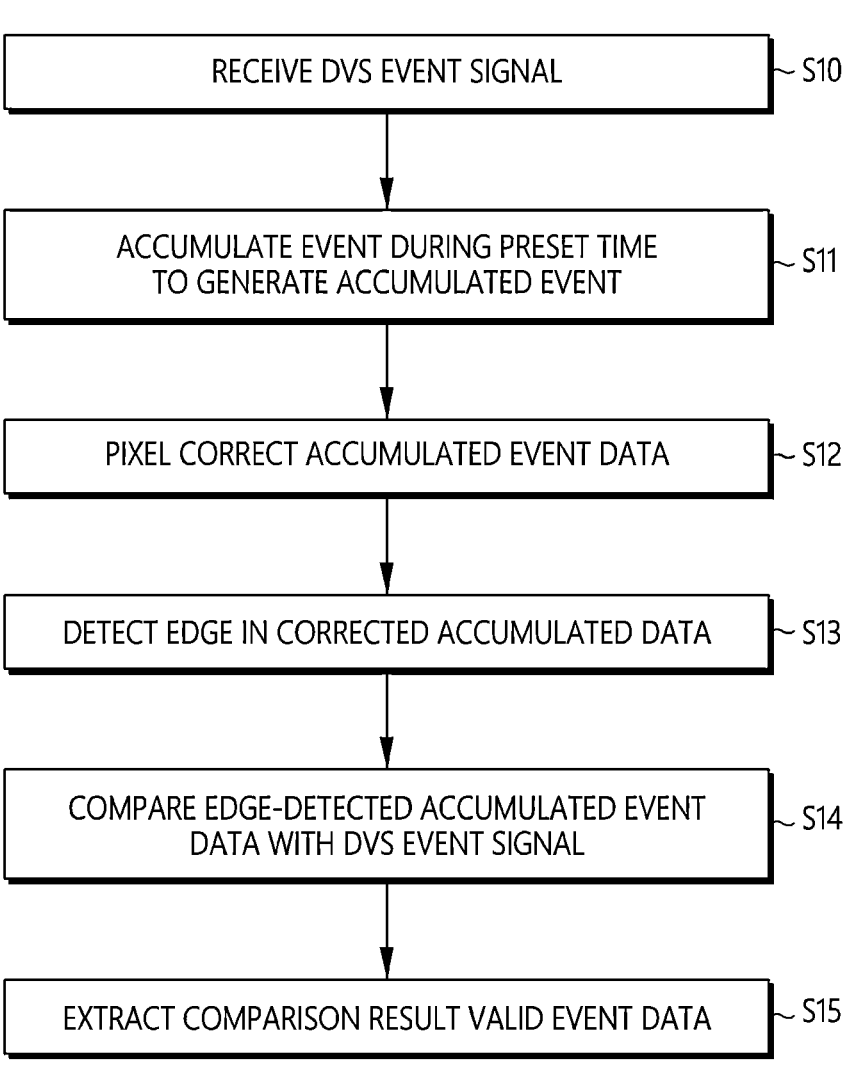
FIG. 9 is a flow chart for explaining a method for operating the ESP of FIG. 6.

FIG. 9 is a flow chart for explaining a method for operating the ESP of FIG. 6.

The ESP 500 receives raw event signals based on the light reflected from the object, from each of the pixels in the pixel array of the vision sensor (S10). The ESP 500 accumulates the raw event signals during a preset time, generates accumulated event data, and stores the generated event data in the memory (S11). The preset time may be set by the reset signal received by the ESP 500. The preset time may be a time of cycle or more according to the flicker frequency of the light source according to some embodiments. Alternatively, according to some embodiments, at the preset time, the base time is set depending on the flicker cycle, which is determined to be general flicker, but when the flicker signal of other light sources is sensed within the preset time set previously, the accumulation cycle, i.e., the preset time may be adjusted, by utilizing the delayed reset.

The memory may be implemented as a 1-bit memory array that indicates whether an event occurs according to some embodiments, or may be implemented as a 2-bit memory array that indicates whether an event occurs and whether a flicker occurs according to some embodiments.

The ESP 500 corrects the error pixels of the accumulated event data (S12). The pixel correction may be, for example, an operation of scanning the accumulated event data with a window to perform a smoothing filtering.

The ESP 500 detects edges in the corrected accumulated event data (S13). This is because the motion resolution may be increased when detecting the motion at the edge of the object rather than the motion at the plane of the object.

The ESP 500 compares the corrected accumulated event data or edge-detected accumulated event data with the raw event signal (S14). As a result of the comparison, among the raw event signals, signals that do not overlap the accumulated event data are detected as the valid event data, and overlapping signals may be identified as flicker (S15).

Figure 10:
FIG. 10 is a block diagram that specifically shows the ESP of FIG. 3 according to some embodiments.
Figure 10:
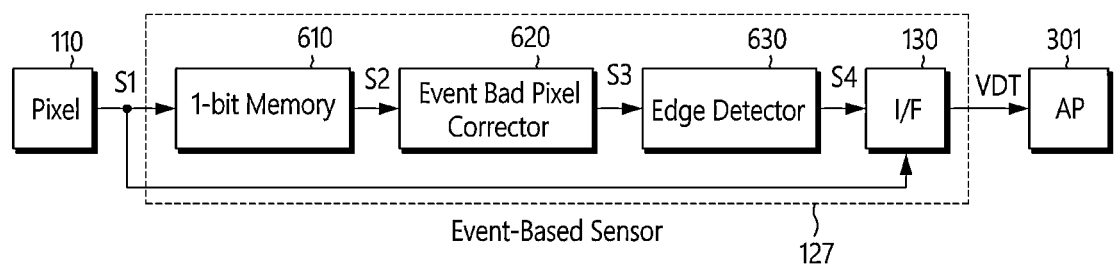

FIG. 10 is a block diagram that specifically shows the ESP of FIG. 3 according to some embodiments.

Referring to FIG. 10, a vision sensor 600 may be connected to an application processor 301, including the pixel array 110 and the event base sensor 127. The event base sensor 127 may be, for example, the ESP 127 of FIG. 5 or the ESP 500 of FIG. 6.

The event base sensor 127 may include a 1-bit memory array 610, an event bad pixel corrector 620, an edge detector 630, and an input/output unit 130. The 1-bit memory array 610 may store event status information depending on the presence or absence of event signals in the raw event signal S1. The 1-bit memory array 610 is an array that is mapped to the pixel array and includes a plurality of 1-bit memories, and may store the event status information in the 1-bit memories of the position corresponding to pixel position at which an event has occurred. The 1-bit memory array 610 may be implemented as, for example, any one of a SRAM (Static Random Access Memory), a MRAM (Magnetic Random Access Memory), a DRAM (Dynamic Random Access Memory), and a flip-flop.

For example, the 1-bit memory array 610 includes On-event and Off-event as described in FIG. 5, may store the event status as a logic high when an On-event occurs, may store the event status as a logic low when an Off-event occurs, and may reduce a memory space, by storing the event status only for the pixels that sense the occurrence of On/Off-events.

The event bad pixel corrector 620 may detect an error pixel in the accumulated event data S2 and perform a pixel correction which replaces the error pixel with a corrected pixel value, when the raw event signal is accumulated during a preset time in the 1-bit memory array 610.

The edge detector 630 detects edges in the corrected accumulated event data S3.

The input/output unit 640 extracts the valid event data by comparing the edge-detected accumulated event data S4 with the raw event signal.

The application processor 301 controls the operation of an electronic apparatus including the vision sensor, using the valid event data.

Figure 11:
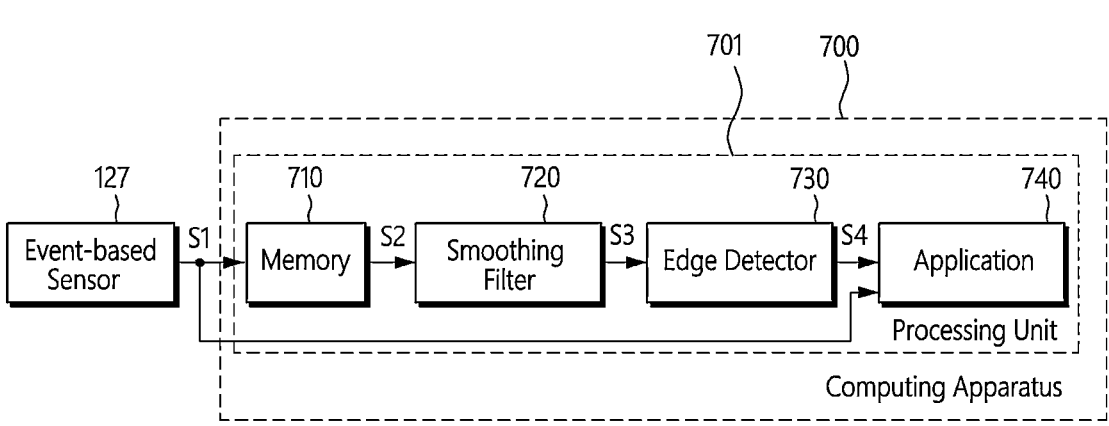
FIG. 11 is a block diagram that specifically shows the ESP of FIG. 3 according to some embodiments.

FIG. 11 is a block diagram that specifically shows the ESP of FIG. 3 according to some embodiments.

Referring to FIG. 11, a computing device 700 is connected to the event base sensor 127, and may include a processing unit 701. The event base sensor 100 may be, for example, a dynamic vision sensor that generates the event signal that senses the motion.

The processing unit 701 may include a memory 710, a smoothing filter 720, an edge detector 730 and an application 740. The memory 710 may be implemented, for example, like the event integrator 510 described in FIG. 6. The smoothing filter 720 may be implemented, for example, like the filter 520 described in FIG. 6. The edge detector 730 may be implemented, for example, like the edge detector

530 described in FIG. 6. The application 740 performs specific operations on the processing unit 740, and may extract and utilize the valid event data from the accumulated event data as a part of the specific operations. For example, it may be implemented like the event selector 540 described in FIG. 6. In addition, repeated contents of FIG. 6 will be omitted for convenience of explanation.

Figure 12:
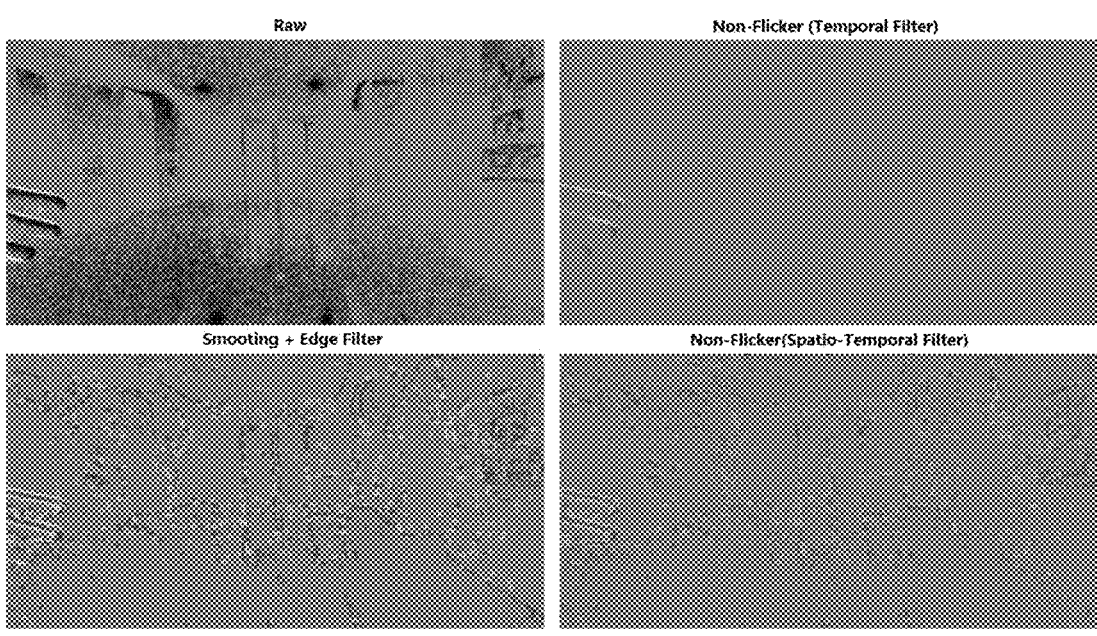
FIG. 12 is a diagram showing a comparative example showing valid event data with flicker removed and a first simulation result of the disclosure.
Figure 13:
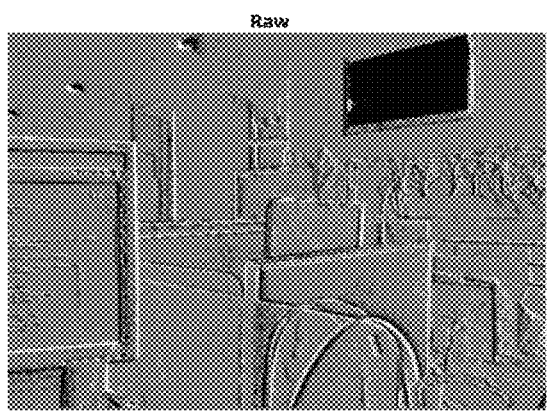
FIG. 13 is a diagram showing a comparative example showing valid event data with flicker removed and a second simulation result of the disclosure.
Figure 13:
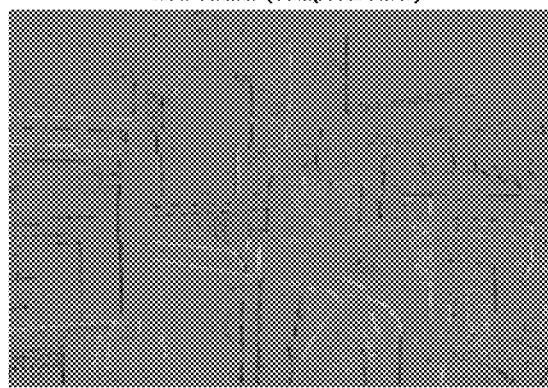
Figure 13:
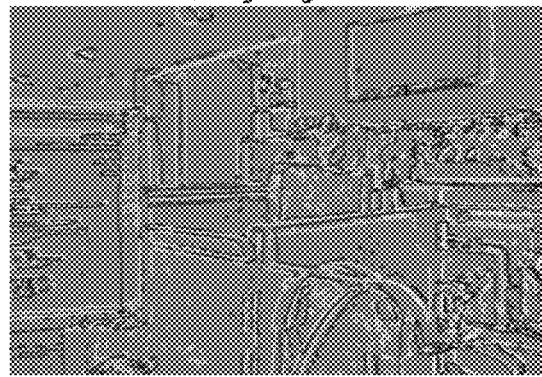
Figure 13:
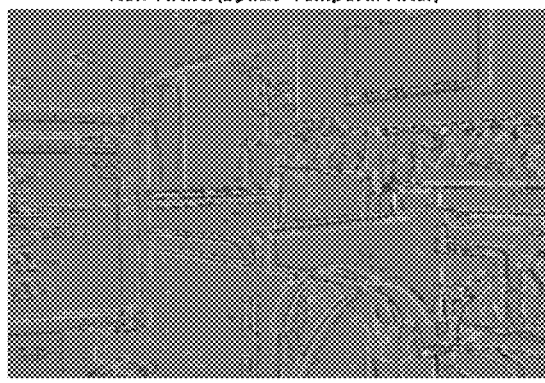

FIG. 12 is a diagram showing a comparative example showing valid event data with flicker removed and a first simulation result of the disclosure, and FIG. 13 is a diagram showing a comparative example showing valid event data with flicker removed and a second simulation result of the disclosure.

A left top figure (Raw) is the raw event data, a right top figure (Non-Flicker (Temporal Filter)) represents the valid event data of Comparative example 1 (Temporal Filter) with flicker removed, a left bottom figure (Smoothing+Edge Filter) represents valid event data according to the embodiment of the disclosure, and a right bottom figure (Non-Flicker (Spatio-Temporal Filter)) represents valid event data of Comparative example 2 (Spatio-Temporal Filter) with flicker removed.

Referring to FIG. 12, if the flicker light source is a fluorescent lamp, the raw event signal Raw includes event status information about the left finger and indoor space along with the flicker signal. Comparative example 1 (right top) is an example in which the flicker component is simply removed. In this case, high-frequency components among the motion signals are removed together, and only the finger is detected, and other information in the indoor space is shown only dimly and hardly detected. Comparative example 2 (right bottom) also dispersively extracts the flicker component according to the flicker light source, but the low-frequency flicker component remains as it is, and it is almost difficult to detect the indoor space and the finger.

However, in the case of valid event using the disclosure (left bottom), accumulated event data may be filtered and edge-detected to extract contours of the indoor space and finger, while removing the flicker component.

FIG. 13 shows a case where the flicker light source is a fluorescent lamp and a monitor. Looking at the raw event signal Raw, not only the contour of the objects but also the plane are recognized and displayed. In the case of Comparative example 1 (right top), even the high frequency components among the motion signals are removed together, the On/Off-events according to the motion are shown dimly, and information is lost to the extent that the object as a whole is difficult to recognize. In the case of Comparative example 2 (right bottom), although the object contour (edge) is detected better than in Comparative example 1, it is shown that much information is lost in comparison to the raw event signal to detect motion.

However, in the case of valid event using the disclosure (left bottom), even though the flicker light sources are of various types (fluorescent lamps, monitors), since the accumulated event data is generated to perform filtering and edge detection, much edge information about the object is included, while largely preserving the information displayed in the event signal in comparison to the comparative examples.

The image processing device according to the embodiment of the disclosure has an effect of being able to accurately extract the edge of an object at the same time, while efficiently removing unnecessary flicker components according to the flicker light source in the raw event signal.

Figure 14:
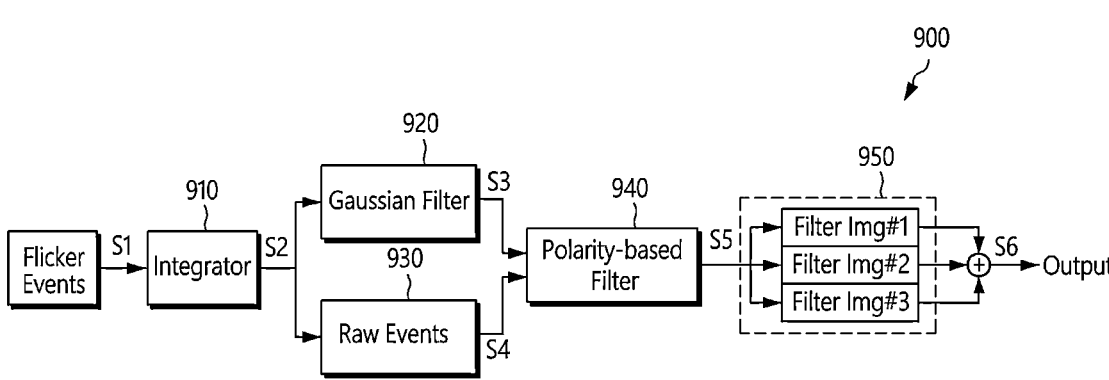
FIG. 14 is a block diagram showing an ESP 900 according to still another embodiment.
Figure 15:
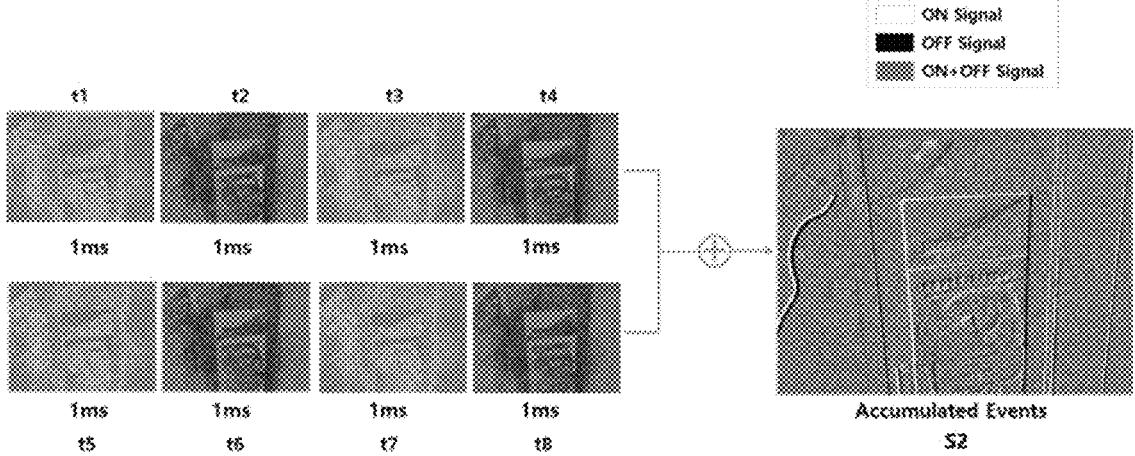
FIG. 15 is a diagram for explaining an accumulated image.
Figure 16:
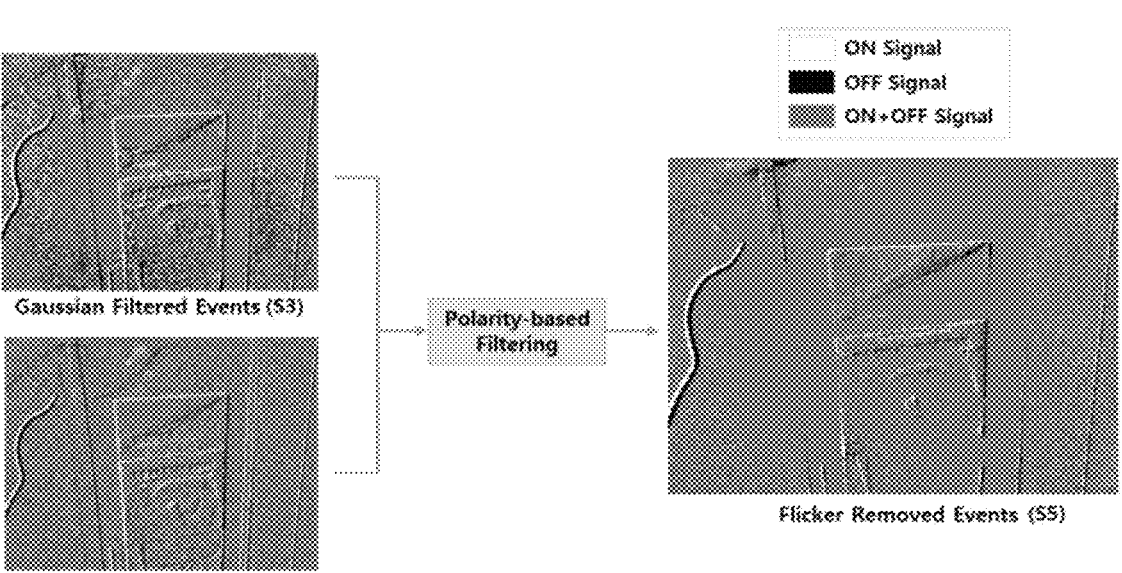
FIG. 16 is a diagram for explaining an image generated via the first filter and the second filter.

FIG. 14 is a block diagram showing an ESP 900 according to still another embodiment. FIG. 15 is a diagram for explaining an accumulated image, and FIG. 16 is a diagram for explaining an image generated via the first filter and the second filter.

Referring to FIG. 14, the ESP 900 is connected between the pixel array 110 of the visual sensor and the application processor, according to some embodiments. The ESP 900 includes an event integrator 910, a first filter 920, a second filter 940 and a summer 950.

The event integrator 910 receives and cumulatively stores the event signals generated by the pixel array 110 during a preset unit time. The event integrator 910 may be called, for example, a first memory. The unit time may be, for example, a time that is preset by a control signal (e.g., a reset signal) received by the AER (125 of FIG. 3 or 124*a* of FIG. 4). Unlike the embodiment of FIG. 6, the accumulated time of FIG. 14 may have a constant time instead of being variable.

The preset unit time may be a time longer than the flicker cycle. For example, it may be the time that is twice as long as the flicker cycle or longer. As an example, if the flicker cycle is 1 ms, the unit time may be set to 8 ms.

The event integrator 910 accumulates the On-event status or the Off-event status during the unit time and stores it as an accumulated image S2, according to the presence or absence of light reflected from the object for each pixel, that is, the raw event signal S1. Since the accumulated image S2 is obtained by accumulating the event status during a time longer than the flicker cycle, the On-event signal or the Off-event signal due to flicker coexist in the same pixel.

When the event signal S1 generated at a cycle of 1 ms is accumulated for 8 ms, the event integrator 810 generates an accumulated image (Accumulated Events, S2) in which the On-event signal or the Off-event signal is accumulated.

Referring to FIG. 15, when the On-event (ON signal) is displayed in white, the Off-event (OFF signal) is displayed in black, and the pixel in which the On-event signal and the Off-event signal overlap is displayed in gray, the raw event signal in the light source with the flicker cycle of 1 ms is detected mainly as the On-event signal at t1, t3, t5, and t7, and detected mainly as the Off-event signal at t2, t4, t6, and t8. That is, in the raw event signal at each time point, the polarity event of the On/Off-event signal may be widely displayed not only on the edge but also on the plane.

When accumulating and summing all the raw event signals from t1 to t8, an accumulated image that includes all kinds of information about the edge and the plane, as shown at right S2. When examining the accumulated image S2, the On-event signal and the Off-event signal with different polarities are accumulated and displayed more clearly.

The first filter 920 filters the pixel in which the On-event status and the Off-event status overlap in the accumulated image S2. For example, the first filter 920 may be implemented as a Gaussian filter capable of scanning the accumulated image with a window, and may perform Gaussian filtering on a window region centered on the pixel in which On-event status or Off-event status overlaps. The window region may be, for example, a 3×3 array, a 5×5 array or a 7×7 array. Due to Gaussian filtering, adjacent pixels in the window centered on the pixel in which On/Off-event statuses overlap are blurred. Since the blurred region spreads to be wider than the original, the flicker region may be mostly blurred in the accumulated image S2 based on the raw event information.

Referring to FIG. 16, when Gaussian filtering is performed on the accumulated image S2, since the pixel in which the On-event signal and the Off-event signal overlap is blurred with respect to the pixels displayed in gray, a Gaussian-filtered image S3 is generated, like generally dimming in comparison to the accumulated image S2.

A row image transfer unit 930 buffers and transfers the accumulated image S2 as it is.

The second filter 940 performs polarity filtering for subtracting the filtered accumulated image S3 from the buffered accumulated image S4. When the second filter 940 performs the polarity filtering for subtracting the Gaussian-filtered image S3 from the original image S2 of the accumulated image, as in the right image of FIG. 16, there is an effect of removing the flicker noise of a wider region, like replacing the pixel value of the empty pixel region with no information between the pixels in which On-Off polarities overlap.

The summer 950, which may be a circuit for summation operation, sums and outputs polarity-filtered images generated by repeating the process of accumulation, first filtering, and second filtering at least three times.

For example, each of a first accumulated image generated by accumulating during the first unit time, a second accumulated image generated by accumulating during the second unit time, and a third accumulated image generated by accumulating during the third unit time may be subjected to Gaussian filtering (920) and polarity filtering (940) to generate a first polarity filtering image (Filter Img #1), a second polarity filtering image (Filter Img #2), and a third polarity filtering image (Filter Img #3).

The first unit time, the second unit time, and the third unit time may be consecutive times without overlapping each other. For example, when the first unit time (t) elapses starting from 0 s, the second unit time starts at the same time, while the first accumulated image is being generated. When the second unit time elapses from the end time of the first unit time (t+t=2t), while the second accumulated image is being generated, the third time unit starts. When the third unit time elapses from the end time of the second unit time (2t+t=3t), while the fourth unit time starting, the third accumulated image is generated. For example, if the flicker cycle is 1 ms, the first accumulated image is generated after 8 ms, the second accumulated image is generated after 16 ms, and the third accumulated image is generated after 24 ms.

The summer 950 store each of the first polarity filtering image, second polarity filtering image and third polarity filtering image obtained by performing the first filtering and the second filtering of the first accumulated image, the second accumulated image and the third accumulated image, and then, sums the first polarity filtering image, the second polarity filtering image and third polarity filtering image stored when output to the application, and outputs them as valid event data. When summing and outputting the polarity-filtered images, since it is possible to minimize filtering of valid event signals when filtering for flicker removal, compared to a case in which the process of performing the accumulation, the first filtering, and the second filtering is performed only once, much edge information about the object can be detected.

Figure 17:
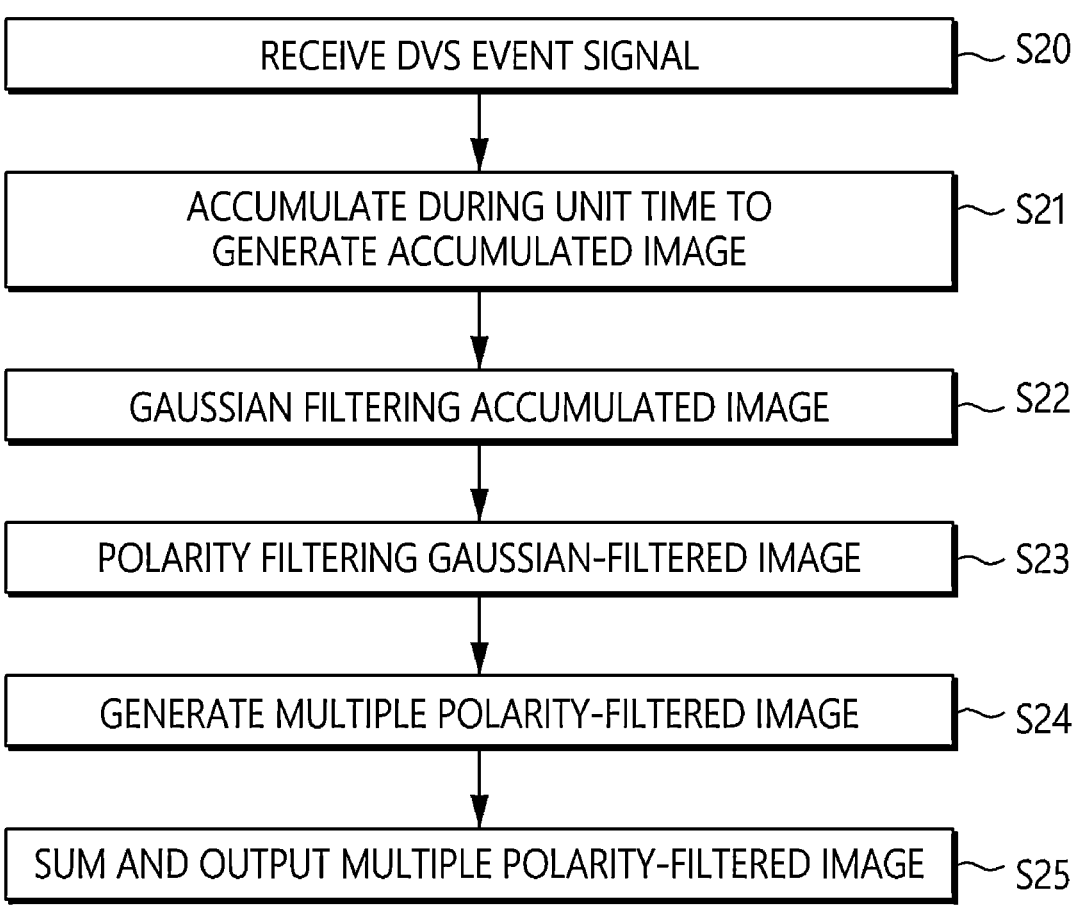
FIG. 17 is a flow chart for explaining the operation of the ESP 900 of FIG. 14.

FIG. 17 is a flow chart for explaining the operation of the ESP 900 of FIG. 14.

Referring to FIG. 17, the ESP 900 receives event signals including flicker events from the pixel array 110 (S20). The ESP 900 generates an accumulated image by accumulating event signals received during a preset unit time (S21). The preset unit time may have a cycle longer than the flicker cycle of the light source, for example, it may have a time cycle twice or more than the flicker cycle.

The ESP 900 performs window scanning and Gaussian filtering on the accumulated image (S22) to perform blurring on the pixel in which On-events and Off-events overlap. The ESP 900 then subtracts the Gaussian-filtered image of S22 from the accumulated image of S21 to generate a polarity filtering image with flicker removed (S23).

The ESP 900 stores a plurality of polarity filtering images that are sequentially generated with the passage of unit time (S24), sums the plurality of polarity-filtered images, and outputs them as valid event data (S25).

Figure 18:
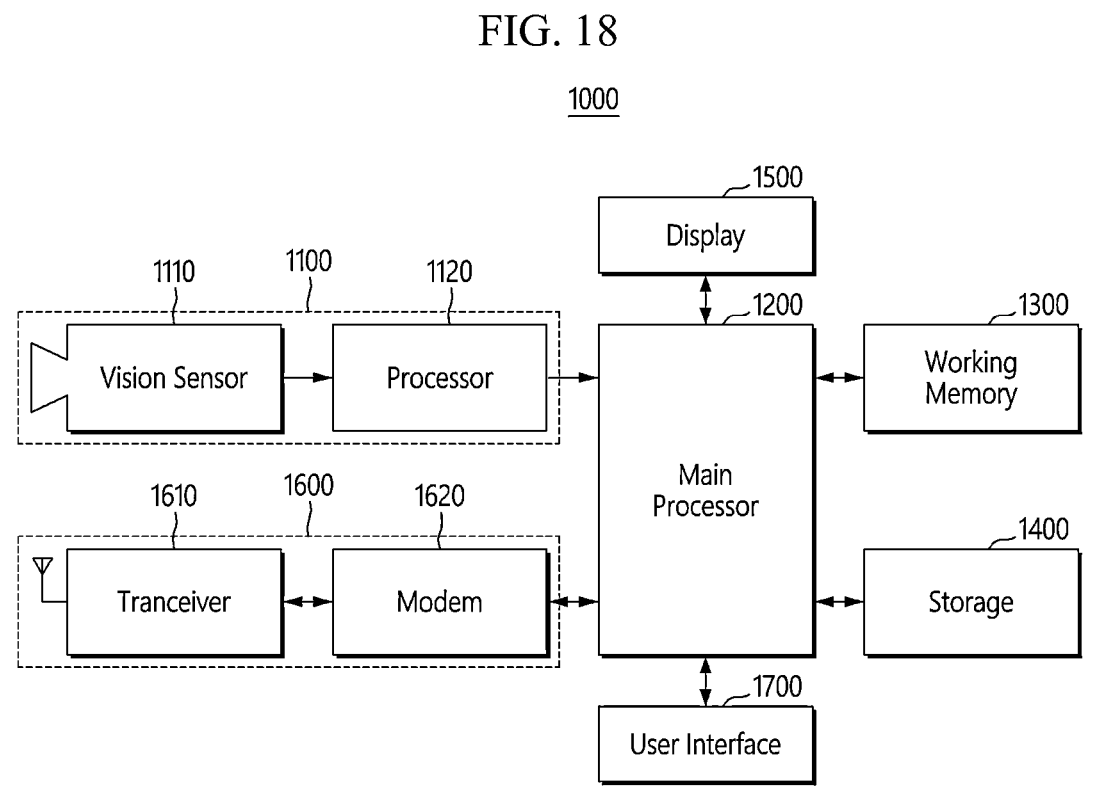

FIG. 18 is a block diagram showing an electronic device to which the vision sensor of FIG. 1 is applied.

For example, the electronic apparatus 1000 may be implemented as a smart phone, a tablet computer, a desktop computer, a laptop computer or a wearable device. Further, electronic apparatus 1000 may be implemented as one of the various types of electronic apparatuses needed to operate unmanned security system, Internet of Things, and autonomous vehicle.

The electronic apparatus 1000 may include an image processing device 1100, a main processor 1200, a working memory 1300, a storage 1400, a display 1500, a communication block 1600 and a user interface 1700.

The image processing device 1100 may be an image processing device implemented to perform the schemes described above through FIGS. 1 to 11.

Alternatively, the event compensation scheme may be executed as software or firmware by the main processor 1200 instead of the processor 1120. In this case, the event compensator 200, which is firmware or software for implementing the scheme of compensating the event occurrence time with the response time, may be loaded into the working memory 1300, and the main processor 1200 may drive it. In this case, since the event compensation scheme is driven/processed by the main processor 1200, the processor 1120 may be omitted in this case.

The working memory 1300 may store data used to operate the electronic apparatus 1000. For example, the working memory 1300 may temporarily store packets or frames processed by the processor 1120. For example, the working memory 1300 may include a volatile memory such as DRAM (Dynamic RAM) and SDRAM (Synchronous RAM), and/or a nonvolatile memory such as a PRAM (Phase-change RAM), a MRAM (Magneto-resistive RAM), a ReRAM (Resistive RAM), and a FRAM (Ferro-electric RAM).

The storage 1400 may store firmware or software for executing the event compensation schemes. Firmware or software for executing the event compensation scheme may be read from the storage 1400 and loaded into the working memory 1300 according to requests or instructions of the main processor 1200. The storage 1400 may include a nonvolatile memory such as a flash memory, a PRAM, a MRAM, a ReRAM, and a FRAM.

The display 1500 may include a display panel and a DSI (display serial interface) peripheral circuit. For example, the display panel may be implemented as various devices such as a LCD (Liquid Crystal Display) device, a LED (Light Emitting Diode) display device, an OLED (Organic LED) display device, and an AMOLED (Active Matrix OLED) display device. A DSI host that is built in the main processor 1200 may perform serial communication with the display panel through the DSI. The DSI peripheral circuit may include a timing controller, a source driver, or the like required to drive the display panel.

The communication block 1600 may exchange signals with an external device/system through an antenna. A transceiver 1610 and a MODEM (Modulator/Demodulator) 1620 of the communication block 1600 may process signals exchanged with the external device/system, according to wireless communication protocols such as LTE (Long Term Evolution), WIMAX (Worldwide Interoperability for Microwave Access), GSM (Global System for Mobile communication), CDMA (Code Division Multiple Access), Bluetooth, NFC (Near Field Communication), Wi-Fi (Wireless Fidelity), and RFID (Radio Frequency Identification).

The user interface 1700 may include at least one of input interfaces such as a keyboard, a mouse, a keypad, a button, a touch panel, a touch screen, a touch pad, a touch ball, a gyroscope sensor, a vibration sensor, and an acceleration sensor.

Components of the electronic apparatus 1000 may exchange data on the basis of one or more of various interface protocols such as a Universal Serial Bus (USB), a Small Computer System Interface (SCSI), a Peripheral Component Interconnect Express (PCIe), a Mobile PCIe (M-PCIe), an Advanced Technology Attachment (ATA), a Parallel ATA (PATA), a Serial ATA (SATA), a Serial Attached SCSI (SAS), an Integrated Drive Electronics (IDE), an Enhanced IDE (EIDE), a Nonvolatile Memory Express (NVMe), and a Universal Flash Storage (UFS).

Although the embodiments of the disclosure have been described above with reference to the accompanying drawings, the disclosure is not limited to the above embodiments, and may be fabricated in various forms. Those skilled in the art will appreciate that the disclosure may be embodied in other specific forms without changing the technical spirit or essential features of the disclosure. Accordingly, the above-described embodiments should be understood in all respects as illustrative and not restrictive.

What is claimed is:

1. An image processing device comprising:
a memory;
a vision sensor; and
at least one processor operatively connected to the memory and the vision sensor,
wherein the at least one processor is configured to:
receive an event signal from a pixel array of the vision sensor;
accumulate the event signal during a preset time and store, in the memory, the event signal as accumulated event data;
perform a pixel correction on the stored accumulated event data; and
compare the corrected accumulated event data with the event signal to extract valid event data.

2. The image processing device of claim 1, wherein the preset time is equal to or longer than a cycle based on a flicker frequency of a light source.

3. The image processing device of claim 1, wherein the pixel correction corresponds to an operation of scanning the accumulated event data with a window to perform a smoothing filtering, and
wherein the smoothing filtering is configured to generate a corrected pixel value based on a pixel value of a peripheral pixel adjacent to an error pixel having an error pixel value in the window, and replace the pixel value of the error pixel in the accumulated event data with the corrected pixel value.

4. The image processing device of claim 3, wherein edges are detected in the corrected accumulated event data after the pixel correction is performed.

5. The image processing device of claim 1, wherein the memory is configured to receive, accumulate, and store the event signal that occurs during the preset time.

6. The image processing device of claim 1, wherein the at least one processor is configured to:

identify a first signal that overlaps the event signal as a flicker, and identify a second signal that does not overlap the event signal as a valid event, and generate the second signal as the valid event data, in the corrected accumulated event data.

7. An image processing device comprising:

a pixel array including a plurality of pixels in a vision sensor, each pixel generating an event signal from light reflected from an object;

a memory operatively connected to the pixel array, the memory being configured to accumulate the event signal during a preset time and to store accumulated event signals as accumulated event data; and a filter configured to perform a pixel correction on the accumulated event data, wherein the image processing device is configured to extract, as valid event data, a signal which is non-overlapped with the corrected accumulated event data, the signal being among event signals generated from the pixel array.

8. The image processing device of claim 7, wherein the pixel correction corresponds to an operation of scanning the accumulated event data with a window smaller than the pixel array to perform a smoothing filtering.

9. The image processing device of claim 8, wherein the smoothing filtering corresponds to an operation of generating a corrected pixel value on a basis of a pixel value of a peripheral pixel adjacent to an error pixel having an error pixel value in the window, and replacing the pixel value of the error pixel in the accumulated event data with the corrected pixel value.

10. The image processing device of claim 7, wherein the preset time is equal to or longer than a cycle based on a flicker frequency of a light source.

11. The image processing device of claim 7, further comprising an edge detector configured to detect an edge of the object in the corrected accumulated event data and to output edge information.

12. The image processing device of claim 7, wherein the memory is a 1-bit memory array configured to store an event status indicating whether an event occurs for each of the plurality of pixels in the pixel array based on the event signal.

13. The image processing device of claim 7, wherein the memory is a 2-bit memory array configured to include:

a first memory configured to store an event status in each of the plurality of pixels in the pixel array, and a second memory configured to store a flicker status in each of the plurality of pixels, based on the event signal.

\* \* \* \* \*